(12) United States Patent
Blenis, Jr.

(10) Patent No.: US 11,555,265 B2
(45) Date of Patent: Jan. 17, 2023

(54) AUGMENTED REALITY SYSTEM FOR STITCHING ALONG A PREDETERMINED PATH

(71) Applicant: RAD LAB 1, Inc., Atlanta, GA (US)

(72) Inventor: Robert S. Blenis, Jr., Atlanta, GA (US)

(73) Assignee: RAD LAB 1, Inc., Atlanta, GA (US)

( * ) Notice: Subject to any disclaimer, the term of this patent is extended or adjusted under 35 U.S.C. 154(b) by 168 days.

(21) Appl. No.: 17/147,354

(22) Filed: Jan. 12, 2021

(65) Prior Publication Data

US 2021/0130997 A1   May 6, 2021

Related U.S. Application Data

(63) Continuation of application No. 16/004,323, filed on Jun. 8, 2018, now Pat. No. 10,889,925, which is a
(Continued)

(51) Int. Cl.

| | |
|---|---|
| *D05B 27/08* | (2006.01) |
| *D05B 19/10* | (2006.01) |
| *D05B 19/12* | (2006.01) |
| *D05B 19/14* | (2006.01) |
| *D05B 19/16* | (2006.01) |
| *D05B 21/00* | (2006.01) |
| *A41H 43/04* | (2006.01) |
| *G03B 21/12* | (2006.01) |
| *G06F 30/17* | (2020.01) |
| *G06F 9/06* | (2006.01) |
| *D05B 81/00* | (2006.01) |
| *A41H 3/00* | (2006.01) |

(Continued)

(52) U.S. Cl.
CPC ............ *D05B 27/08* (2013.01); *A41H 3/007* (2013.01); *A41H 43/04* (2013.01); *D05B 19/085* (2013.01); *D05B 19/10* (2013.01); *D05B 19/105* (2013.01); *D05B 19/12* (2013.01); *D05B 19/14* (2013.01); *D05B 19/16* (2013.01); *D05B 21/00* (2013.01); *D05B 35/102* (2013.01); *D05B 81/00* (2013.01); *G03B 21/12* (2013.01); *G06F 9/06* (2013.01); *G06F 30/17* (2020.01); *G06T 1/0014* (2013.01); *G06T 2113/12* (2020.01); *G06T 2207/20081* (2013.01)

(58) Field of Classification Search
CPC ...... D05B 27/08; D05B 19/085; D05B 19/10; D05B 19/105; D05B 19/12; D05B 19/14; D05B 19/16; D05B 21/00; D05B 35/102; D05B 81/00; A41H 3/007; A41H 43/04; G03B 21/12; G06T 1/0014; G06T 2207/20081; G06F 30/17; G06F 9/06
See application file for complete search history.

(56) References Cited

U.S. PATENT DOCUMENTS

| | | |
|---|---|---|
| 4,821,657 A | 4/1989 | Herdeg et al. |
| 5,042,410 A | 8/1991 | Nakashima |

(Continued)

*Primary Examiner* — Ismael Izaguirre
(74) *Attorney, Agent, or Firm* — Bekiares Eliezer LLP

(57) ABSTRACT

Disclosed are various systems and features for use with a machine, such as a sewing machine, to facilitate augmented-reality features such as projecting assistive visual elements or virtual UI elements into an operational area. Such systems and features may be useful in the context of performing an action along a self-guided path on a substrate.

20 Claims, 34 Drawing Sheets

Related U.S. Application Data continuation-in-part of application No. 15/618,047, filed on Jun. 8, 2017, now Pat. No. 10,563,330.

(60) Provisional application No. 62/517,078, filed on Jun. 8, 2017, provisional application No. 62/517,080, filed on Jun. 8, 2017, provisional application No. 62/517,087, filed on Jun. 8, 2017, provisional application No. 62/517,091, filed on Jun. 8, 2017, provisional application No. 62/517,092, filed on Jun. 8, 2017, provisional application No. 62/517,084, filed on Jun. 8, 2017, provisional application No. 62/347,306, filed on Jun. 8, 2016.

(51) Int. Cl.
    *D05B 19/08*     (2006.01)
    *G06T 1/00*     (2006.01)
    *D05B 35/10*     (2006.01)
    *G06F 113/12*     (2020.01)

(56) References Cited

U.S. PATENT DOCUMENTS

| | | | |
|---|---|---|---|
| 5,205,232 A | 4/1993 | Sadeh et al. | |
| 6,263,815 B1 | 7/2001 | Furudate | |
| 6,499,513 B1 | 12/2002 | Couch | |
| 6,715,435 B1 | 4/2004 | Wieczorek et al. | |
| 8,463,420 B2 | 6/2013 | Tokura | |
| 8,607,721 B2 | 12/2013 | Koga et al. | |
| 10,563,330 B2 * | 2/2020 | Blenis, Jr | D05B 21/00 |
| 10,883,210 B2 * | 1/2021 | Blenis, Jr. | G06T 1/0014 |
| 10,889,925 B2 * | 1/2021 | Blenis, Jr. | A41H 43/04 |
| 10,889,926 B2 * | 1/2021 | Blenis, Jr. | D05B 21/00 |
| 10,889,927 B2 * | 1/2021 | Blenis, Jr. | D05B 19/105 |
| 10,982,365 B2 * | 4/2021 | Blenis, Jr. | G06V 40/28 |
| 11,346,030 B2 * | 5/2022 | Blenis, Jr | D05B 27/08 |
| 2011/0146553 A1 | 6/2011 | Wilhelmsson et al. | |
| 2015/0252503 A1 | 9/2015 | Tokura | |
| 2018/0355530 A1 | 12/2018 | Blenis, Jr. | |

\* cited by examiner

 
*FIG. 25A*     *FIG. 25B*

AUGMENTED REALITY SYSTEM FOR STITCHING ALONG A PREDETERMINED PATH

RELATED APPLICATIONS

This application is a continuation of U.S. application Ser. No. 16/004,323 filed Jun. 8, 2018, which issues Jan. 12, 2021 as U.S. Pat. No. 10,889,925, which is incorporated herein by reference.

Under provisions of 35 U.S.C. § 120, U.S. application Ser. No. 16/004,323 filed Jun. 8, 2018 is a Continuation-In-Part of U.S. application Ser. No. 15/618,047 filed Jun. 8, 2017 (the "NP1 disclosure"), which issued Feb. 18, 2020 as U.S. Pat. No. 10,563,330, which claims benefit of U.S. Provisional Application No. 62/347,306 filed Jun. 8, 2016 (the "PV1 disclosure"), claims benefit of U.S. Provisional Application No. 62/517,078 filed Jun. 8, 2017 (the "PV2 disclosure"), claims benefit of U.S. Provisional Application No. 62/517,080 filed Jun. 8, 2017 (the "PV3 disclosure"), claims benefit of U.S. Provisional Application No. 62/517,084 filed Jun. 8, 2017 (the "PV4 disclosure"), claims benefit of U.S. Provisional Application No. 62/517,087 filed Jun. 8, 2017 (the "PV5 disclosure"), claims benefit of U.S. Provisional Application No. 62/517,091 filed Jun. 8, 2017 (the "PV6 disclosure"), and claims benefit of U.S. Provisional Application No. 62/517,092 filed Jun. 8, 2017 (the "PV7 disclosure"), which are incorporated herein by reference.

Under provisions of 35 U.S.C. § 120, U.S. application Ser. No. 16/004,323 filed Jun. 8, 2018 claims benefit of U.S. Provisional Application No. 62/347,306 filed Jun. 8, 2016 (the "PV1 disclosure"), claims benefit of U.S. Provisional Application No. 62/517,078 filed Jun. 8, 2017 (the "PV2 disclosure"), claims benefit of U.S. Provisional Application No. 62/517,080 filed Jun. 8, 2017 (the "PV3 disclosure"), claims benefit of U.S. Provisional Application No. 62/517,084 filed Jun. 8, 2017 (the "PV4 disclosure"), claims benefit of U.S. Provisional Application No. 62/517,087 filed Jun. 8, 2017 (the "PV5 disclosure"), claims benefit of U.S. Provisional Application No. 62/517,091 filed Jun. 8, 2017 (the "PV6 disclosure"), and claims benefit of U.S. Provisional Application No. 62/517,092 filed Jun. 8, 2017 (the "PV7 disclosure"), which are incorporated herein by reference.

Furthermore, U.S. application Ser. No. 16/004,323 filed Jun. 8, 2018 (the "NP2 disclosure"), which issues on Jan. 12, 2021 as U.S. Pat. No. 10,889,925, is related to the following applications, assigned to the assignee of the present application, and hereby incorporated by reference: U.S. application Ser. No. 16/004,325 filed Jun. 8, 2018 (the "NP3 disclosure"), issued Jan. 12, 2021 as U.S. Pat. No. 10,889,926, U.S. application Ser. No. 16/004,326 filed Jun. 8, 2018 (the "NP4 disclosure"), U.S. application Ser. No. 16/004,329 filed Jun. 8, 2018 (the "NP5 disclosure"), issued Jan. 5, 2021 as U.S. Pat. No. 10,883,210, U.S. application Ser. No. 16/004,330 filed Jun. 8, 2018 (the "NP6 disclosure"), issued Jan. 12, 2021 as U.S. Pat. No. 10,889,927, and U.S. application Ser. No. 16/004,332 filed Jun. 8, 2018 (the "NP7 disclosure").

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to a method and system for stitching along a predetermined path along a material. More specifically, various embodiments of the present disclosure relate to augmented reality and projection systems used in a sewing environment.

BACKGROUND

There is often a need to guide an item on a predetermined path along a substrate for various applications; for example, cutting, gluing, welding, riveting, marking, paint, inspecting, sewing and 3D printing.

Guiding an item, such as a needle, on a desired path along a substrate is particularly significant for materials such as textiles. Known systems and methods suffer from several shortcomings. For example, they require a lot of manual intervention. Further, they may require that the path to be followed actually be on the substrate. In addition, the known systems and methods may be limited to certain styles, patterns and depth of substrates. In addition, they do not provide real-time, self-correction for correcting the position of the item when it gets off the desired path along a substrate.

Therefore, there is a need to improve systems and methods for guiding an item on a desired path along a substrate, such as a sheet of textile material.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One objective of the disclosed guiding apparatus may be to facilitate identifying an object and it's positioning on a substrate, and then performing an action along a self-guided path in association with that object on the substrate.

Additionally, another objective of the guiding apparatus may be to calibrate various components to correctly identify an object and it's positioning on a substrate, and then perform an action along a self-guided path in association with that object on the substrate.

Further, another objective of the guiding apparatus may be to provide data to a sewing machine's controller to operate the sewing machine to stitch along a path associated with the object (e.g., the outline of the object).

Additionally, another objective of the guiding apparatus may be to determine in real time a path to perform certain actions such as stitching, sewing, tacking, cutting, adhesing, bonding, welding, riveting, embossing, marking, painting, dying, etching, masking, measuring, inspecting, cutting, abrading, scoring, 3D printing, or exposing to liquids, gasses, catalysts, agents, or electromagnetic waves.

Further, another objective of the guiding apparatus may be to utilize one or more of lighting units, optical sensors, controllers, and user interface components to perform an action along a self-guided path in association with an object on the substrate.

Additionally, another objective of the guiding apparatus is to be removably attachable to a machine, such as a sewing machine. Accordingly, in order to fulfill one or more objectives, the guiding apparatus may include a support member configured to be mounted on the machine. For instance, as illustrated in FIGS. 1A-B, the support member may be configured to be mounted on a face of the machine's body.

Additionally, the support member may support one or more of lighting units, optical sensors, controllers, and user interface components.

Further, another objective of the guiding apparatus may be to function in one or more of the multiple available modes include a calibration mode, an inspection mode a teaching mode and an operation mode.

Further objective of the guiding apparatus may be to operate in calibration mode including testing illumination or sensor, calibration stitching on a test fabric, comparing the calibration stitching with actual stitching, and making calculations for needle alignment.

Further objective of the guiding apparatus may be operating in inspection mode wherein an operator calibrates a machine, based on actually stitching a test badge to the test fabric. Note that the terms "badge" and "patch" are used interchangeably to refer in a non-limiting sense to fabric and non-fabric items that may be sewed onto, affixed to, or otherwise combined with a material.

Further objective of the guiding apparatus may be to operate in teaching mode to make sure that the sensors of the apparatus can distinguish a background fabric against the material of the badge to be stitched on to the fabric.

Further objective of the guiding apparatus may be to function in operation mode wherein the sensors detect a patch overlaid on the fabric, and they control the sewing machine to automatically sew the patch onto the fabric.

Further, another objective of the guiding apparatus is to integrate with a sewing machine to auto-detect materials to be stitched. Once detected, the guiding apparatus determines, in real-time, a sewing path, sewing stitch integrity, and stitch count. The guiding apparatus further validates the specification for the aforementioned in real-time. For example, it can detect a badge on a fabric and stitch the badge to the fabric. Other materials can include carbon fibers, composite threads, human or animal tissue, and conductive thread.

Embodiments of the present disclosure provide a system comprising, but not limited to, lighting and optical sensors, a controller, and a UI display module. The system may connect to, for example, but not be limited to, a sewing machine with a controller. Although sewing machines are used as some embodiments for descriptive purposes, the integration of the light and optical sensors may be with other controller operated devices, not just sewing machines. For examples, an optical sensor system may be used with laser, IR, 3-D vision, stereoscopic, gyroscopic, Ultrasonic, and other devices.

A general principle of the present disclosure involves the use of the lighting and optical sensor system to identify objects, their placement/positioning on a substrate, and to perform an action along a self-guided path in association with that object on the substrate. One example is the stitching of an identified object onto the substrate. In this example, the optical system may provide data to a sewing machine's controller to operate the sewing machine. In turn, the machine may be enabled to stitch along a path associated with the object (e.g., the outline of the object). Accordingly, embodiments of the present disclosure may be enabled to determine in real time a path to perform certain actions such as cutting, welding, riveting, gluing, 3D printing, etc.

Referring back to the example of sewing, embodiments of the present disclosure integrate with a sewing machine so as to be able to auto-detect materials to be stitched. Once detected, the system may be used to determine, in real-time, a sewing path, sewing stitch integrity, and stitch count. The system may further validate the specification for the aforementioned in real-time. As one example, it can detect a badge on a fabric and stitch the badge to the fabric. Other materials can include carbon fibers, composite threads, human or animal tissue, conductive thread, and the like.

Various embodiments of the present disclosure may operate in, but not be limited to, the following modes: 1) calibration, 2) inspection, 3) teaching, and 4) operation.

During calibration mode, the system may ensure that the optical sensors are properly aligned with the sewing needle for control. As will be detailed below, the stages involved in calibration include: 1) illumination/sensor testing, 2) calibration stitching on a test fabric (e.g., a white sheet), and 3) comparing the calibration stitching with actual stitching, and 4) making calculations for needle alignment. In this way, an operator may determine that the sewing machine's needle is properly calibrated to its sensors.

During the inspection mode, a test badge may be stitched to a test fabric. In turn, the operator may again be enabled to calibrate the machine, but this time. The operator can then determine if the machine was calibrated properly by seeing how the test badge was stitched to the fabric.

An objective of the teaching mode may be to ensure that the sensors are enabled to distinguish the background fabric (e.g., a color/texture/pattern) with the material of the badge to be stitched on to the fabric. In other words, a teaching mode may be used to ensure that the optical sensors and illumination components are properly optimized for the fabric type. Once the system determines the fabric type, it can better detect the badge overlaid on the fabric and more accurately stitch the badge to the fabric. The teaching stage may be performed once for each batch of fabrics, and may not need to be performed each time.

Once the system is configured, the system may enter an operation mode. The operation mode may employ the system sensors to detect a badge overlaid on the fabric and control the sewing machine to automatically sew the badge onto the fabric.

It should be understood that actions performed by an operator may be replaced with a processing module embodied in the systems of the present disclosure.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings and their brief descriptions below may contain text or captions that may explain certain embodiments of the present disclosure. This text is included for illustrative, non-limiting, explanatory purposes of certain embodiments detailed in the present disclosure. In the drawings:

FIGS. 25A-B illustrates top plan views of exemplary patches with which a guiding apparatus consistent with the present disclosure may interact.

DETAILED DESCRIPTION

Figure 1A:
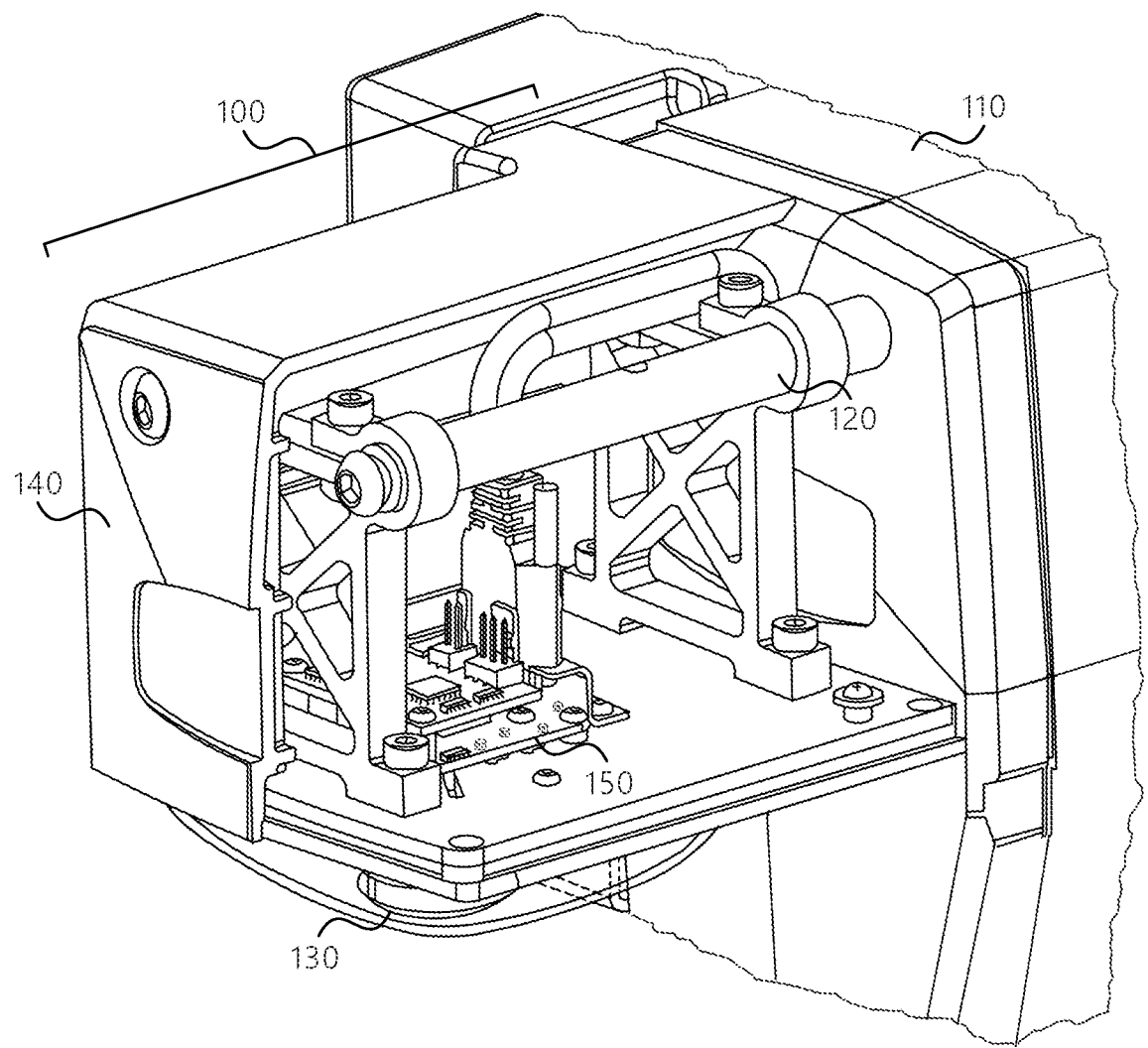
FIG. 1A illustrates a sectional views of a guiding apparatus in accordance with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of stages of various processes or methods that are described herein are illustrative and not restrictive. Accordingly, it should be understood that, although stages of various processes or methods may be shown and described as being in a sequence or temporal order, the stages of any such processes or methods are not limited to being carried out in any particular sequence or order, absent an indication otherwise. Indeed, the stages in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "stage for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of stitching along a self-guided path, embodiments of the present disclosure are not limited to use only in this context. For example, the embodiments disclosed herein may apply to, but not be limited to, cutting, gluing, welding, riveting, marking, paint, inspecting, sewing and 3D printing.

I. Overview

This overview is provided to introduce a selection of concepts in a simplified form that are further described below. This overview is not intended to identify key features or essential features of the claimed subject matter. Nor is this overview intended to be used to limit the claimed subject matter's scope.

Consistent with embodiments of the present disclosure, a guiding apparatus (or simply "apparatus") 100 for use with a machine 110 for to facilitating identifying an object and its positioning on a substrate (such as a textile, as with garments), and then performing an action along a self-guided path in association with that object on the substrate may be provided. Further, also provided is a platform configured to communicate with one or more of the guiding apparatus 100 and the machine 110 in order to facilitate performing an action along a self-guided path. As used in the present disclosure, the term "apparatus" 100 may also be more broadly understood to include machine 110 along with features and components thereof, and operations performed thereby. For example, while machine 110 may technically be responsible for various actions or steps as part of a sewing operation in an embodiment, it would be no less accurate to refer to the "sewing operation performed by guiding apparatus 100."

The disclosed guiding apparatus 100 may be, or may comprise, a sewing machine. Alternatively or in addition, apparatus 100 may be, or may comprise, a device or system capable of performing operations such as stitching, sewing, tacking, cutting, adhesing, bonding, welding, riveting, embossing, marking, painting, dying, drying, etching, masking, measuring, illuminating, inspecting, cutting, abrading, scoring, or 3D printing. Apparatus 100 may be, or may comprise, a device or system capable of: sewing garments; sewing patches on apparel and accessories; producing or performing operations on non-flat objects and surfaces (i.e., "3-dimensional" objects such as footwear, hats, protective gear, medical devices, electronic components, integrated circuits, etc.); producing, embedding, or performing operations on electronic devices. As used in the present disclosure, the terms "sewing" and "sewing operation" may also be more broadly understood to include a variety of operations that may be performed by guiding apparatus 100.

Figure 1B:
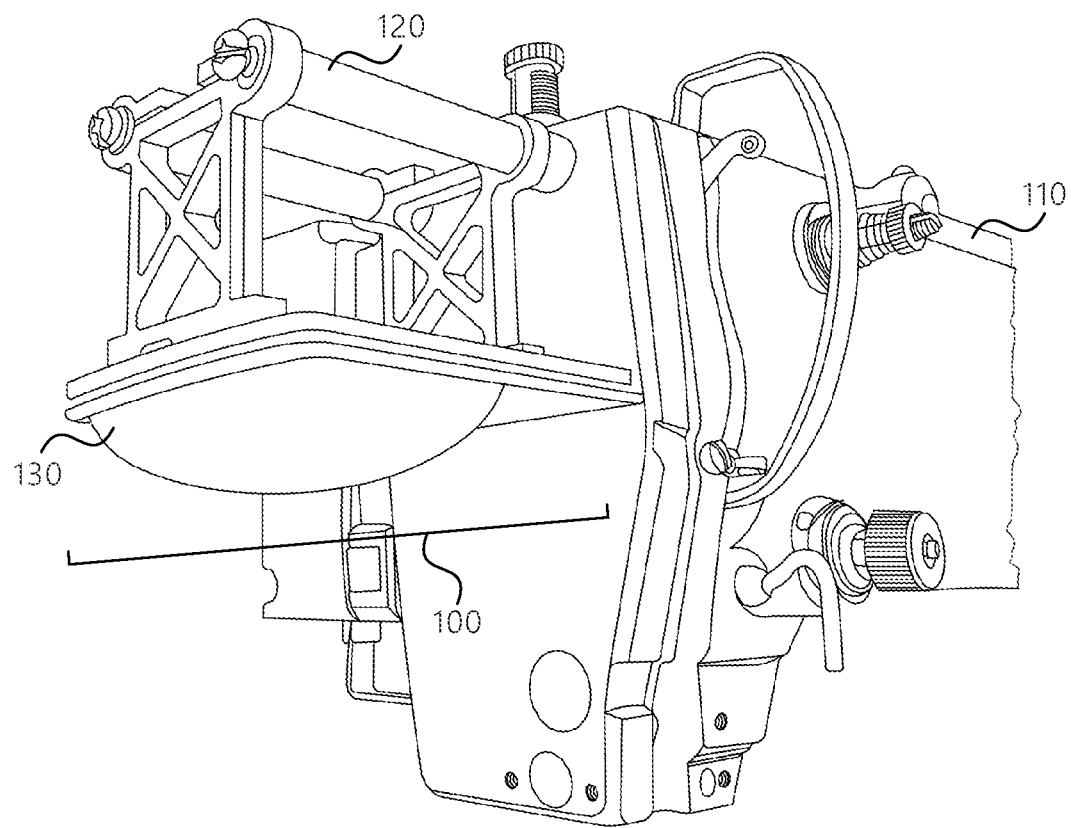
FIG. 1B illustrates a perspective view of a support member of a guiding apparatus in accordance with various embodiments of the present disclosure.

Apparatus 100 may include a support member 120 configured to be attached to at least a portion of a machine 110; for example, a sewing machine. The support member 120 may be removably attached to the machine 110. Alternatively, the support member 120 may be permanently attached to the machine 110. For example, as illustrated in FIGS. 1A-B, the support member 120 may be in the form of a bracket that may be secured to a face plate of a sewing machine 110 (near the end of the sewing machine with the needle). FIG. 1A illustrates electronic components 150 of apparatus 100 mounted on the support member 120. The electronic components 150 may include one or more of sensors, cameras, and lighting units (depicted in FIGS. 1A-B as part of sensor system 130) user interface components and wiring, as shown in more detail in conjunction with FIGS. 5 and 32. The lighting units (or "illumination sources") may include one or more of LED, incandescent, laser, and other sources, and may emit various wavelengths on the electromagnetic spectrum, including visible spectrum, infrared, UV, radio, x-ray, or other wavelength. The sensors may include optical, sonic, ultrasonic, temperature, pressure, positional, rotational, atmospheric, chemical, or various other types.

Figure 2:
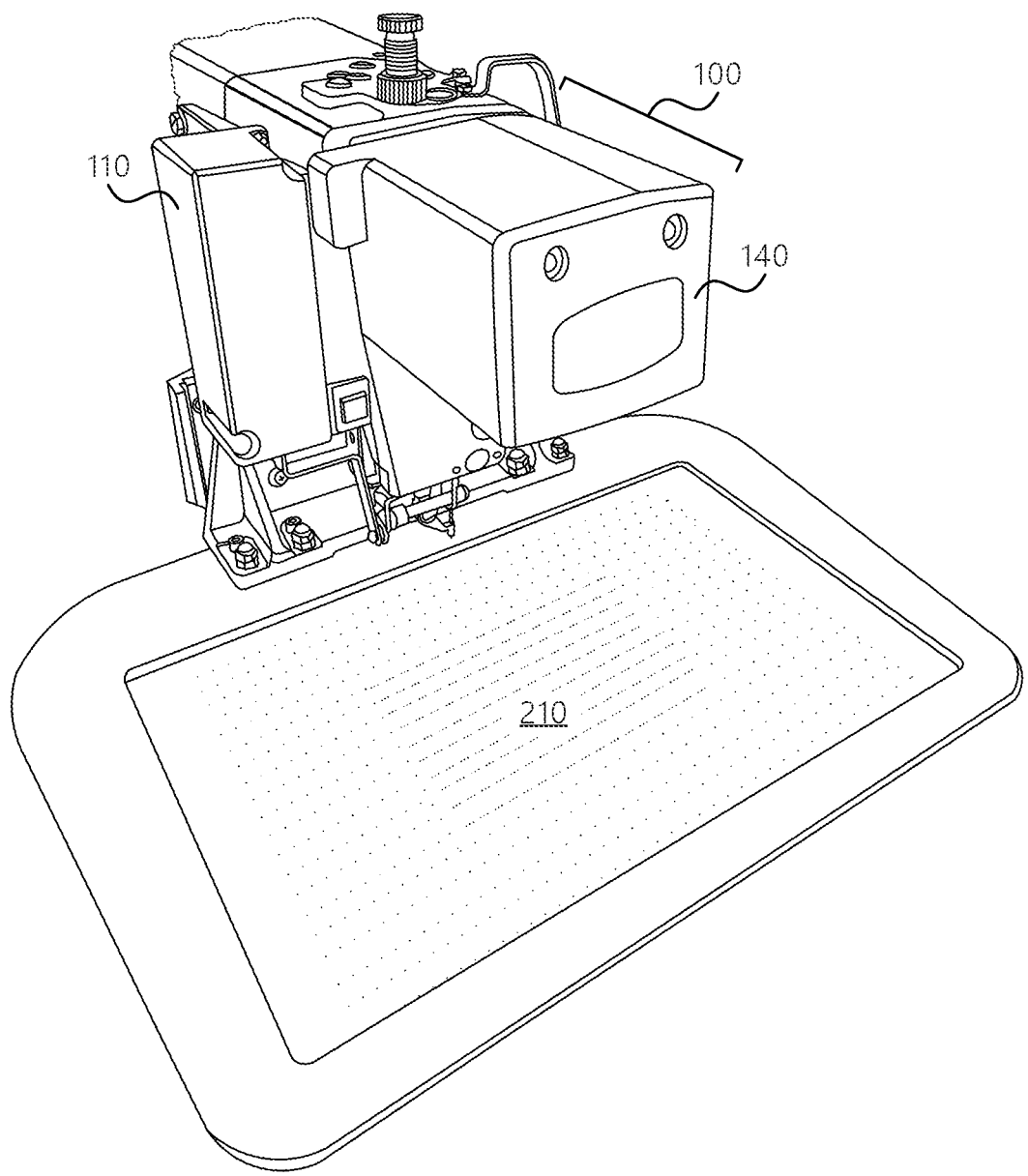
FIG. 2 illustrates a perspective view of a guiding apparatus with a cover and a test fabric placed within the stitching area of a sewing machine in accordance with various embodiments of the present disclosure.
Figure 3:
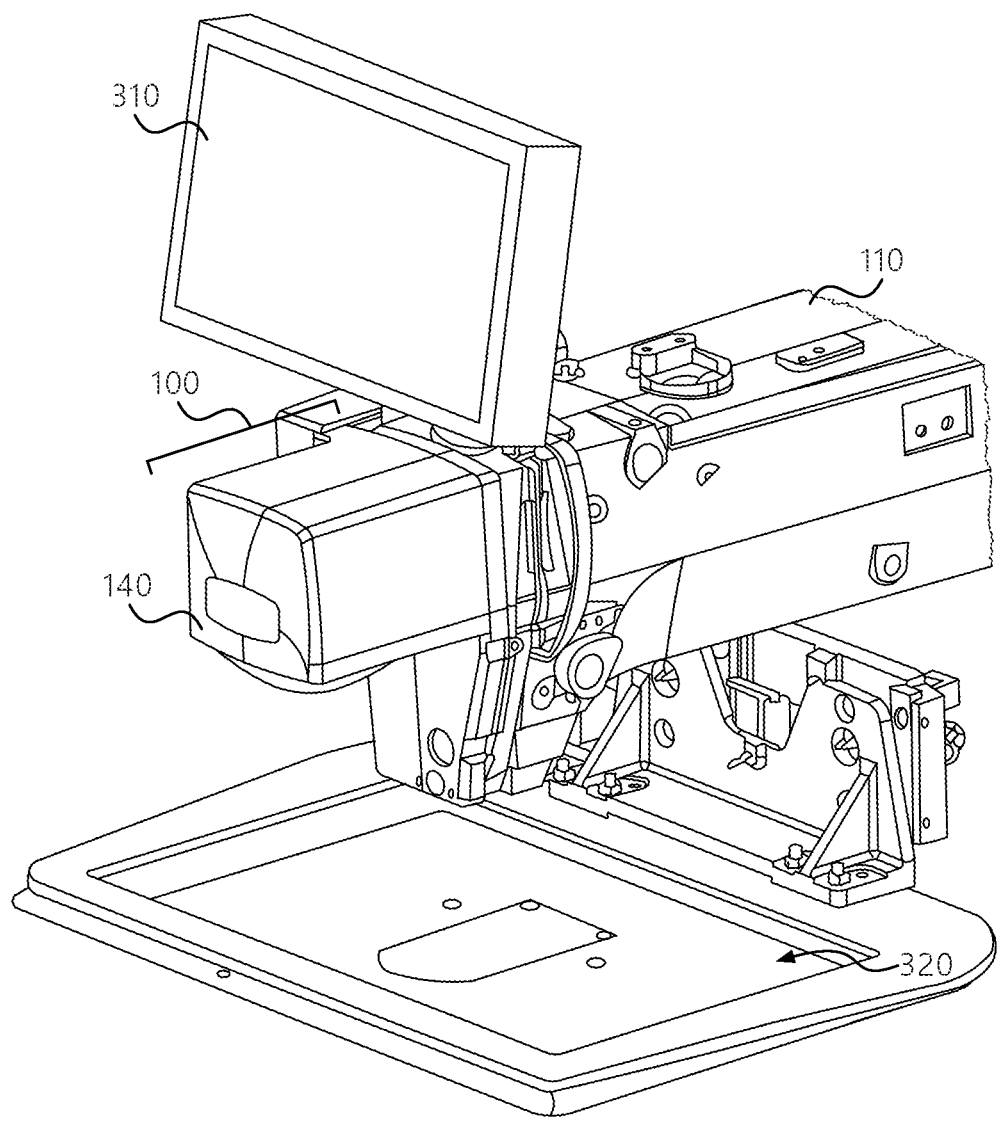
FIG. 3 illustrates a perspective view of a guiding apparatus attached to a machine in accordance with various embodiments of the present disclosure.

The guiding apparatus 100 may further include a cover 140 for support member 120. For example, FIGS. 1A, 2, and 3 show different views of a cover 140 placed over the support member 120. A cover 140 can provide a pleasing design to the apparatus 100 and the sewing machine 110. Further, the cover 140 can provide protection to the electronic components 150 of the guiding apparatus 100.

As shown in FIG. 3, the guiding apparatus 100 may also include a user interface ("UI") component 310. A UI component 310 may installed on one of the support member 120 and the machine 110. The user interface component 310 may include one or more of a keyboard, a mouse, a trackpad, a touchscreen, or other user interface to provide input to the guiding apparatus 100 and/or to display one or more output parameters.

Apparatus 100 may comprise, or operate upon or within, an operational area 320. Operational area 320 may be, or comprise, the work area of a machine 110 such as a sewing machine. The area encompassed by an operational area 320 may extend beyond just the immediate work surface or machine working area. For example, in an embodiment featuring a virtual light curtain (or "VLC") system, the operational area 320 may have a monitoring boundary away from, or extending beyond, the article upon which operations are being performed by apparatus 100. The operational area 320 may also be understood as the section of the machine working area in which a feature is operable, as with augmented reality (or "AR") systems that may illuminate and project patterns over a section—e.g., in the vicinity of sewing operations—of the machine working area. In some embodiments (for example, where apparatus 100 is "roving" rather than stationary, operational area 320 may be more properly characterized as being a "field of view" of the apparatus 100 or its vision or operational systems rather than a fixed, stationary area.

An object—such as a garment, a patch, a length of textile, a pocket, a hat, a shoe, a substrate, or a device—that is to be acted upon (e.g., sewn, adhesed, cut, painted, scored, etc.) by apparatus 100 may be referred to as an "operational object". Conversely, references in the present disclosure to a "patch" or "patches" may also be understood to include various other operational objects.

Further, in some embodiments, the guiding apparatus 100 may be able to function in one or more of multiple available modes and sub-modes, including calibration mode(s), inspection mode(s), training mode(s), and operation mode (s). For example, a calibration mode may include testing illumination, vision, or other sensors, capturing image or video data, visual projections, calibration stitching on a test fabric 210, comparing the calibration stitching with actual stitching, or making calculations for needle alignment.

An inspection mode can include an operator calibrating a machine 110, based on actually stitching a test badge to the test fabric 210. The teaching mode can include making sure that sensors of the apparatus 100 can distinguish a background fabric against the material of a patch to be stitched onto the fabric. An operation mode can include detecting a patch overlaid on the fabric and controlling the sewing machine 110 to automatically sew the badge onto the fabric.

In some embodiments, apparatus 100 may employ an augmented reality (AR) system to assist an operator with operation of the machine 110 (see the PV2 disclosure). An augmented reality system may, for example, project assistive features into the workspace such as garment or patch alignment guides, instructions, status indicators, or virtual controls. In various embodiments, an augmented reality system can be calibrated by projecting one or more fiducial markers or patterns onto a workspace in addition or alternative to other calibration processes.

In some embodiments, apparatus 100 may comprise a "patch library" or "patch library system", whereby the system can be trained to recognize patches and perform appropriate sewing operations (see the PV3 and NP3 disclosures). In various embodiments, a patch library may be trained on one or more patches, storing sewing parameters such as patch visual features, patch contours, stitch patterns, thread parameters (thickness etc.), and patch orientation relative to garment/substrate.

In various embodiments consistent with an apparatus 100 comprising a patch library, a library of patches and names may be used to improve quality and reduce operator mistakes, especially in the area of sewing letters on a shirt, such as in sporting apparel. The operator may enter the name, and then place the letters on the shirt to be sewn. The vision system may then find the letters as normal and auto-generate the stitch patterns, but can also verify the correct placement of the individual patches, verify they are all present and preventing misspellings.

Currently, edge contrast is used to find outline and holes of patches, but in an alternative—for example, comprising a patch library—artwork or other graphical features inside the patch may be used to identify a pre-taught patch. This can be useful when the edge of the patch is similar in color to the background material, or the background material is too complex to remove. The patch may be taught using a contrasting background to auto-detect the contours, just like in normal sewing, but then the actual background material is placed in the machine and the patch is found again, this time using the internal pattern of the patch to find it in the image. The location outline and holes of the patch are then estimated from the pre-taught patch library item.

In some embodiments, guiding apparatus 100 may employ a "virtual light curtain" feature that can detect ingress of objects into the workspace area (see the PV4 and NP4 disclosures). In various embodiments, guiding apparatus 100 may slow or halt sewing operation upon detecting a hand (e.g., the operator's) or an obstruction enter the workspace. In another embodiment, apparatus 100 may cue process stages by the entrance and exit of operator hands in the work area, For example, a stage may entail an operator loading a garment in the workspace, which loading might itself entail placing, orienting, flattening, and securing the article. An apparatus 100 may be configured to detect these operations within the virtual light curtain and commence further stages once hands and other obstructions are clear of the workspace. In yet another, a virtual light curtain can interpret operator hand gestures as commands.

In some embodiments, apparatus 100 may have a patch tacking feature that sews some preliminary stitches at strategic points on a patch in order to secure it to the garment to which it is to be sewn (see the PV5 and NP5 disclosures).

In some embodiments, guiding apparatus 100 may comprise a 3-dimensional vision system (see the PV6 and NP6 disclosures). Such a system might involve, but is not limited to, for example: stereoscopic cameras, one or more sensors (electromagnetic, acoustic, ultrasonic, etc.) that are depth-sensitive or otherwise capable of mapping spatial morphology of patches, or visual processing of 3-D features via controlled motion of items in the workspace. In various embodiments, a 3-D vision system can aid apparatus 100 in performing operations (e.g., sewing, painting) on substrates having complex and/or non-flat morphology—such as a shoe, a hat, item of sports equipment, or a medical implant. Though no patch is "perfectly flat" (either in the sense of zero height deviation or in the sense of zero thickness), embodiments wherein apparatus 100 can perform actions on "non-flat objects" or along "3-dimensional predetermined paths" may comprise the ability to accurately image (with depth) 3-dimensional objects and perform actions along a plurality of spatial directions and rotational axes.

In various embodiments consistent with an apparatus 100 comprising 3-D vision capabilities, stereo vision may be utilized to ascertain thickness or deformation (including stretching, bunching, sagging and edge curling) of a patch, substrate, or other operational object. Non-uniformity in (or deviation from ideal of) thickness, as well as various deformation, can introduce errors in path placement—for example, a sewing operation may veer off course even if it's following it's predetermined path. Some embodiments consistent with this disclosure utilize mono-vision, wherein the patch thickness and material thickness might be stored or manually entered as settings.

In some embodiments, apparatus 100 may include a multi-patch multi-view ("MPMV") mode (see the PV7 and NP7 disclosures). In various embodiments, an apparatus 100 in MPMV mode may perform one or more "low-res" initial patch finding operations, followed by one or more "high-res" patch edge finding operations for each patch (note that relative resolution may not be meaningfully different, in that any or all stages could be "high-res" from an image quality standpoint). An MPMV mode may improve accuracy by reducing stitch location errors related to perspective, patch height, and material thickness.

In various embodiments consistent with an apparatus 100 comprising an MPMV mode, a high-resolution process may be employed to improve accuracy and reduce errors due to patch thickness variation or material sagging. In an embodiment, after initial processing, areas sensitive to height variations (e.g., near the edges of the image, where perspective view angle is large) may be flagged, and the machine 110 can automatically move the patch under the camera to take additional images while positioned directly over the previous locations that were near the edge of the image. In addition to minimizing errors due to perspective or material/patch thickness, found edges can be stitched or spliced together to create a more accurate stitch path.

By way of non-limiting illustrative categorization, MPMV may be seen as a subset of "variable-patch variable-view" ("VVVV") operation, which also includes multi-patch single-view ("MPSV") operation (i.e., one patch finding operation for multiple patches) and single-patch multi-view ("SPMV") (i.e., multiple patch finding operations for a single patch). In an embodiment, apparatus 100 could utilize SPMV to estimate in a first pass the locations of features on the single patch, and then make a second pass, which may include moving the camera or the patch/substrate surface under the camera so that a more optimal view of each individual feature is achieved. This might help in eliminating uncertainties in material thickness and flatness, edge curling, and other deviations from idealized operation which may lead to the generation of a more accurate sew path. In an embodiment, apparatus 100 could utilize SPMV to aid in the accurate path generation for a single patch that might be too large to be imaged all at once in some embodiments. Broadly, references in the present disclosure to MPMV operation also include other modes of VVVV operation unless otherwise stated.

In various embodiments, material sagging may be estimated to improve calibration and projection of edges in the image into sewing coordinates. The amount of sagging can vary with different materials and heavier patches. This information may be placed in a lookup table, and the operator may specify what background material is being used. Then patch area can be estimated by the guiding apparatus to estimate sagging, and thereby improve overall accuracy.

In various embodiments, there is a multiplicity of potential opportunities to include a stage of automatically detecting whether operator hands or another obstruction are in the workspace. A few examples include, but are not limited to: stage 1105 in FIG. 11, stage 1425 in FIG. 14, and stage 1625 in FIG. 16. In embodiments consistent with this disclosure, apparatus 100 can comprise obstruction-detecting features.

Apparatus 100 may comprise a "feature avoidance system" that allows the avoidance of "non-processable features" in an operation such as sewing. Features that might get this "no-sew" treatment (n. b. any operation, including painting, cutting, etc., may get this treatment) are delicate or not-to-be-pierced features such as electrical wires, batteries, display elements (e.g., flexible OLED), or glassy materials; hard features such as struts, rivets, and metallic materials, and other undesirable locations such as adhesive points and fluid-filled areas. In one example, a sewing operation may be directed to sew around or over (but not through) a non-processable feature.

In various embodiments, non-processable features may be pre-programmed (e.g., by a training process or by a user) into a system such as a patch library system. In some embodiments not inconsistent with the above embodiments, apparatus 100 may have the capability (mediated by, e.g., vision systems or other types of sensors) of detecting non-processable features in real-time, in the context of an in-progress operation. In an embodiment, an object upon which operations may be performed is a medical device, which may comprise supporting structures, tissues, or wires that must be avoided so as not to harm the device. An example is a heart valve, which may contain a flexible metal structure to which apparatus 100 sews material. In another embodiment, operations upon wearable electronics may avoid wires, displays, or other sensitive features that are designated as non-processable.

Apparatus 100 may comprise a featureless patch detection system (FPDS), which may be beneficial when working with patches that don't have sufficiently visually identifying (or any) internal features, which ordinarily may aid a vision system in locating a patch.

Apparatus 100 may comprise an altered visual guidepost compensation system (AVGCS), which may be beneficial when working with patches that have stretched/skewed/curled features that might otherwise throw off the vision system.

Apparatus 100 may comprise an optical uniformity disambiguation system (OUDS), which may be beneficial when working with patches whose colors, patterns, or other qualities (e.g., sheen) are insufficiently distinguishable from the substrate to otherwise be accurately processed.

Apparatus 100 may comprise a feature transform compensation system (FTCS), which may be beneficial when working with patches and substrates whose characteristic features (e.g., a pattern) differ in the operational context from the "idealized" context by way of rotation, translation, reflection, or scaling.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Configuration

Figure 4:
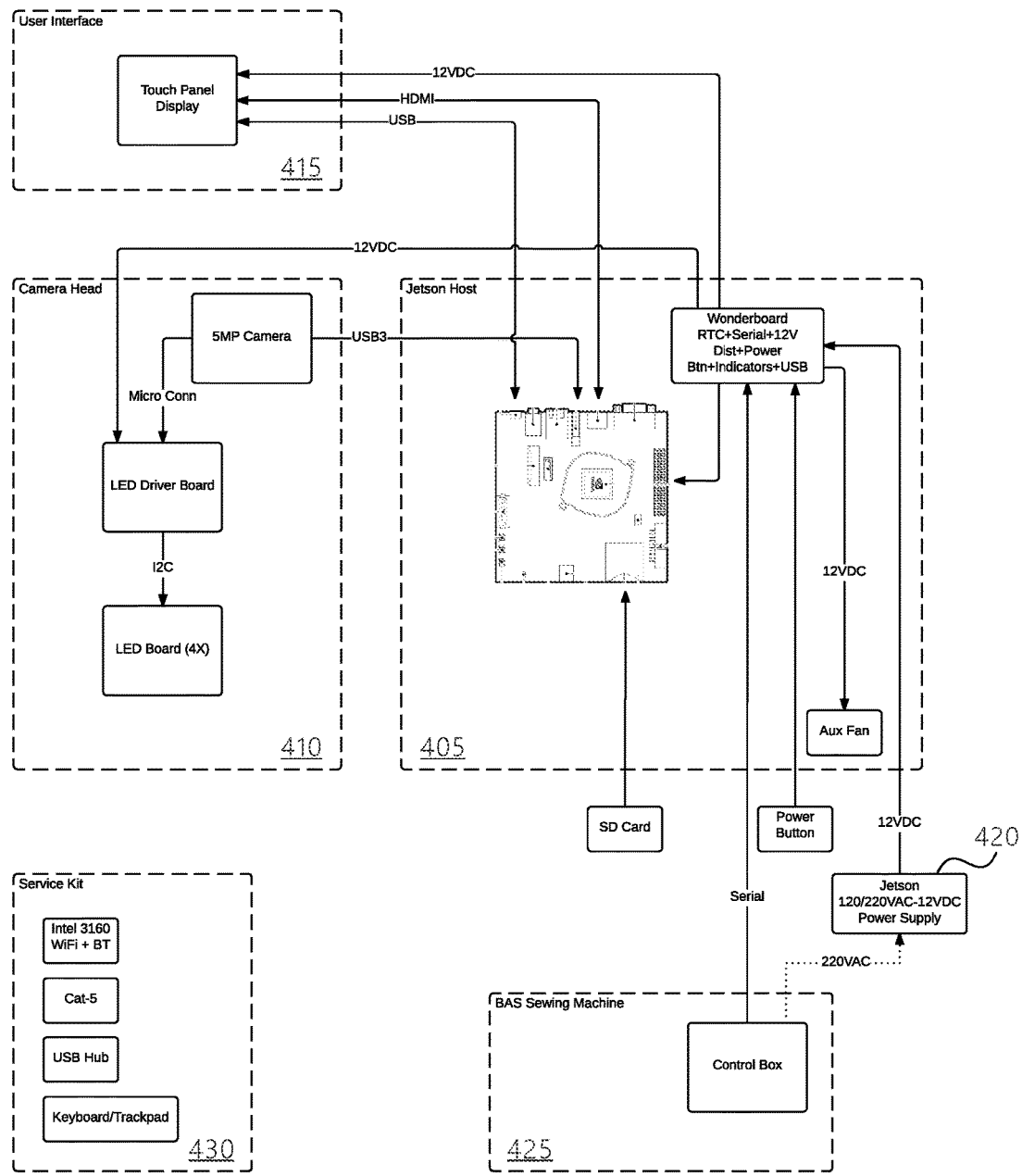
FIG. 4 is a block diagram of a computing unit of a guiding apparatus in accordance with various embodiments of the present disclosure.

FIG. 4 is a block diagram of an exemplary computing unit 400 In various embodiments of guiding apparatus 100. The computing unit 400 can include a processing unit 405 comprising a processor and a memory. For example, processor 405 may be a Jetson host processor from NVIDIA®. Further, any other computing device such as a stationary device and a mobile, handheld device may be integrated.

The processing unit 405 can connect to camera head 410 (which can include lighting from e.g., an LED source), a user interface device 415 (such as touch panel display), a power supply 420, a control box 425 of the sewing machine 110, and auxiliary or "service kit" items 430 (such as Wi-Fi/Bluetooth communication modules, USB hub, Keyboard/Trackpad and Cat-5 cables).

Figure 5:
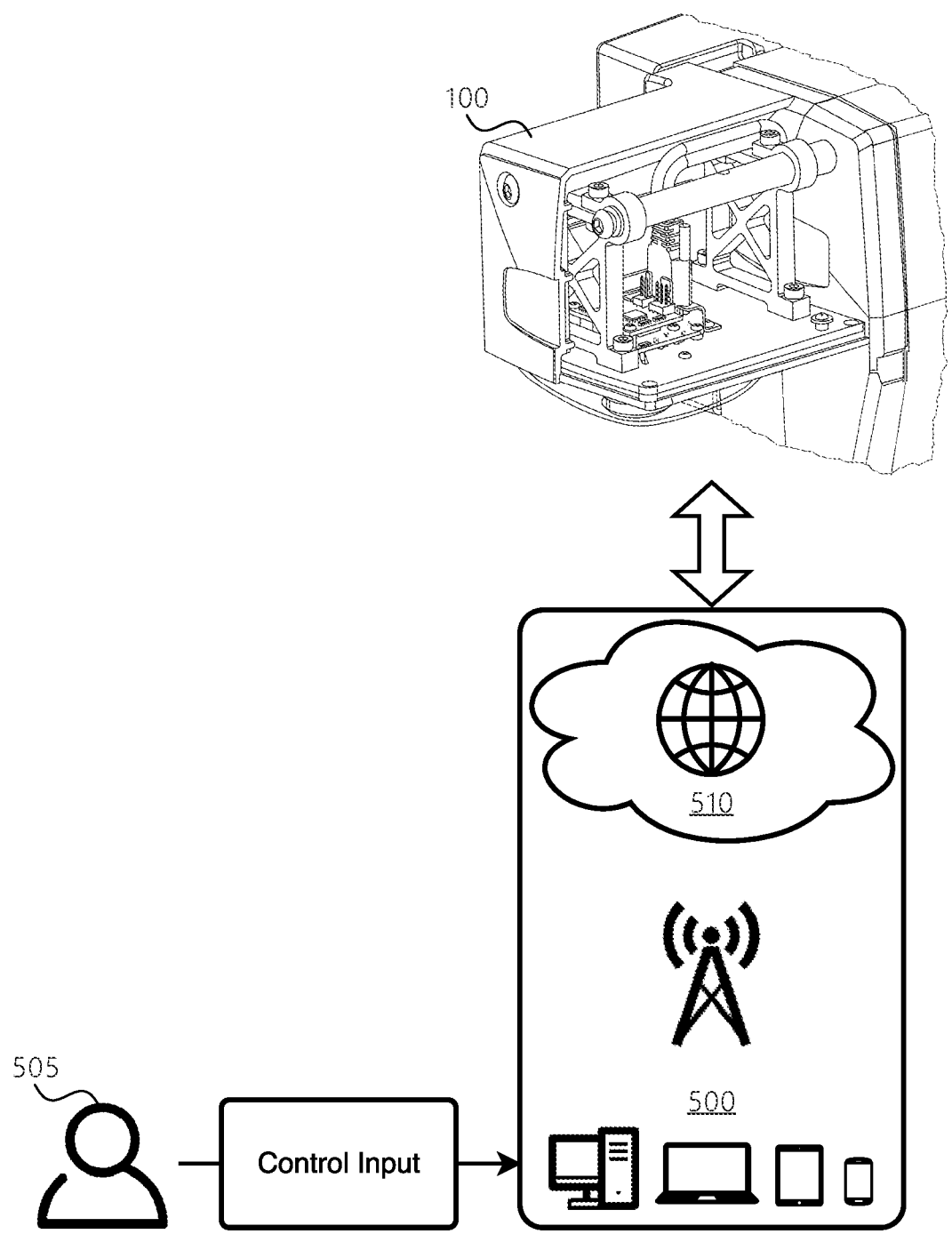
FIG. 5 illustrates an operating environment through which a guiding platform consistent with various embodiments of the present disclosure may be provided.

FIG. 5 illustrates one possible operating environment through which a guiding platform 500 consistent with embodiments of the present disclosure may be provided. By way of non-limiting example, platform 500 may be hosted on a centralized server, such as, for example, a cloud computing service. Alternatively, in some embodiments, platform 500 may be implemented on one or more of the computing units of the guiding apparatus 100.

A user 505 may access platform 500 through a software application. The software application may be embodied as, for example (but not be limited to), a website, a web application, a desktop application, and a mobile application compatible with a computing device 3200. Further, a user 505 could control one or more operations related to guide an item along a path while performing an operation as exemplarily illustrated.

Accordingly, platform 500 may be configured to communicate with each of the computing unit of the guiding apparatus 100 and the sewing machine 110 over communication network 510. For instance, the platform 500 may be configured to receive control inputs from user 505 in order to initiate a guiding session.

Accordingly, in some embodiments, the platform 500 may communicate with a software application installed on the computing unit of the apparatus 100. For example, in some instances, the platform 500 may send command signals to the software application in order to control guiding operations such as perform calibration, perform inspection, perform teaching and perform operation.

Further, in some instances platform 500 may also be configured to transmit configuration settings to be adopted while guiding along a path. Accordingly, the computing unit of guiding apparatus 100 may be configured to guide along a path based on the received configuration settings. Any of platform(s) 500, apparatus(es) 100, machine(s) 110, and computing device(s) 3200 may be involved in the generation, transmission, storage, processing, enactment, or supervision of sewing instructions and other operations.

As will be detailed with reference to FIG. 32 below, the computing device 3200 and/or the mobile device through which the platform 500 may be accessed may comprise, but not be limited to, for example, a desktop computer, laptop, a tablet, or mobile telecommunications device.

III. Operation

The disclosed guiding apparatus 100 can work in one of multiple available modes: 1) calibration, 2) inspection, 3) teaching, and 4) operation. During calibration mode, the system can ensure that the optical sensors are properly aligned with the sewing needle for control. The stages involved in calibration may include: 1) illumination/sensor testing, 2) calibration stitching on a test fabric 210 (e.g., a white sheet), 3) comparing the calibration stitching with actual stitching, and 4) making calculations for needle alignment. In this way, apparatus 100 determines that the sewing machine's 110 needle is calibrated with its sensors. The calibration mode is explained in further details in conjunction with FIGS. 6-8.

FIGS. 6-24, 26, 27, and 29-31 are flowcharts setting forth general stages involved in methods consistent with various embodiments of the present disclosure. Methods 600-2400, 2600, 2700, and 2900-3100 may be implemented using a computing device 3200 as described in more detail below with respect to FIG. 32 below, and may be referred to as "computer implemented methods."

Although the methods 600-2400, 2600, 2700, and 2900-3100 have been described to be performed by computing device 3200, it should be understood that, in some embodiments, different operations may be performed by different networked elements in operative communication with computing device 3200.

Various stages in the methods 600-2400, 2600, 2700, and 2900-3100 may be performed by at least one of a sewing machine 110, its vision system stage, and its operator. An operator may perform stages using various interface elements available on one or both of the guiding apparatus 100 and the sewing machine 110. In some embodiments, a sewing machine 110 may have foot pedals: Left Foot Pedal (LFP) and Right Foot Pedal (RFP).

Further, one of the guiding apparatus 100 and the sewing machine 110 may have two keys on an operator panel: F1 key (or "Tension+" key) and F2 key (or "Tension−" key). The keys Tension (+) and Tension (−) may each have their own respective functions when not operating in calibration mode. However, apparatus 100 can have its own controller that intercepts communications from the sewing machine 110 controller, enabling it to override the functionality of Tension (+) and Tension (−) based on the current "mode" of operation. In various embodiments, a user interface component 310 or a projection from the apparatus 100 may provide an operator with, e.g., instructions on what button to press next, what actions to take, where to place garments and patches, error messages related to placement, quality, obstructions in the workspace, etc.

Note that the calibration and other methods explained in conjunction with FIGS. 6-24, 26, 27, and 29-31 may be enhanced with the option of less human interaction or replacement of human involvement or based upon desired functions presented to the lighting and optical sensor system (also known as a "VGM") by an integrated machine/system or data compiled and analyzed within a production facility (IoT).

600. Calibration

Figure 6:
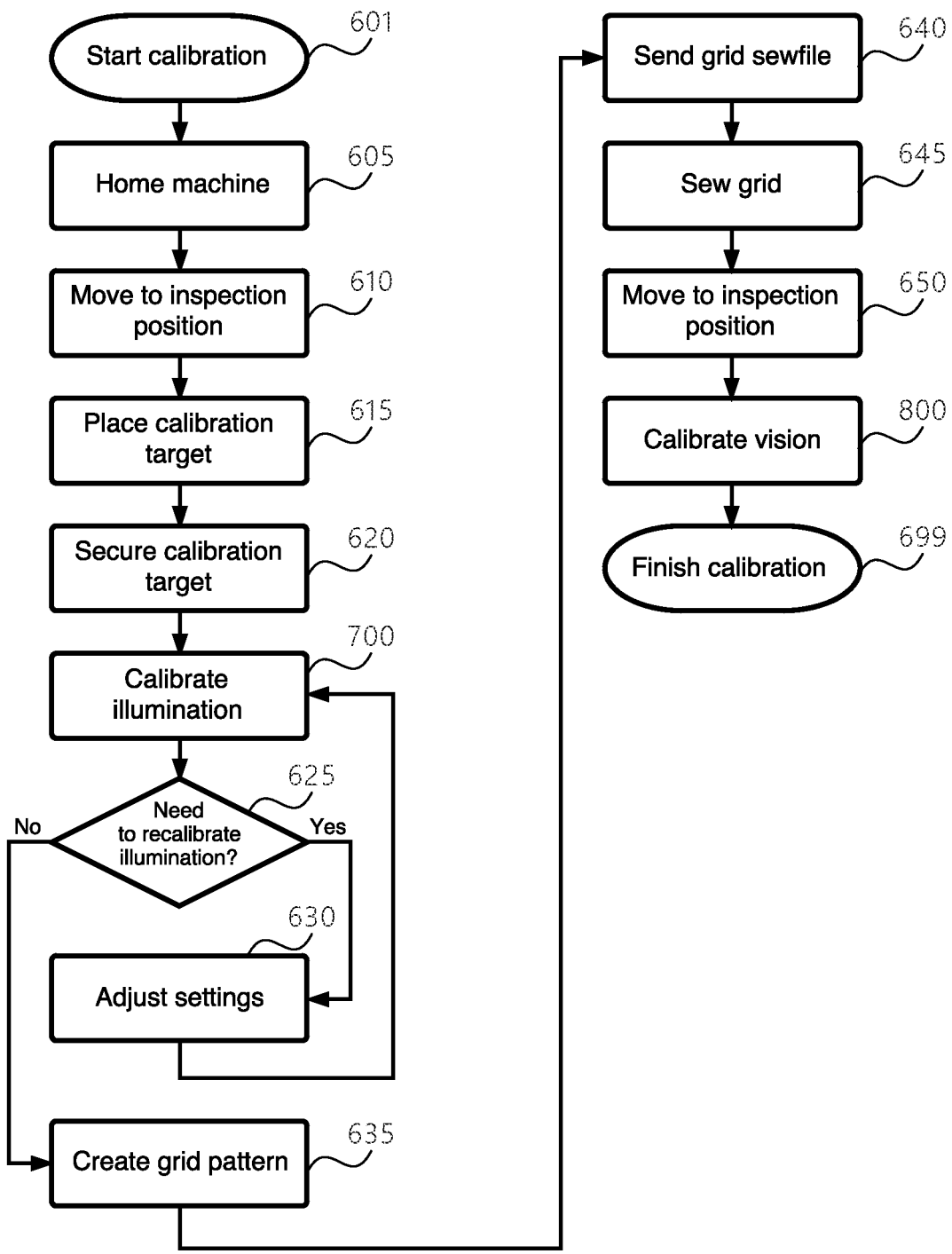
FIG. 6 is a flowchart related to a calibration method consistent with various embodiments of the present disclosure.

FIG. 6 is a flowchart related to a calibration method 600 consistent with various embodiments of the present disclosure. Calibration may begin at stage 601. First, an operator of the sewing machine 110 may enter calibration mode using, e.g., a user interface component 310 (such as a touch interface system), a gesture recognition feature, a mobile device, etc. The guiding apparatus 100 can then enter calibration mode. In some embodiments, apparatus 100 may perform a sequence of stages, including a stage 605 of homing the machine 110 and a stage 610 of moving to inspection position.

Next, at stage 615, the operator may insert a calibration target—for example, test fabric 210, which may be a white paper—and at stage 620 can secure the calibration target.

Note that in the context of method 600 and other methods disclosed herein, stages that involve "inserting", "placing", "loading", or "securing" may involve an operator or the system itself checking, opening, and closing clamps, or other similar or related processes.

In an example, FIG. 2 shows a test fabric 210 placed within the stitching area of the sewing machine. FIG. 2 shows a test fabric 210 with "holes" made during an earlier test. In some embodiments, test fabric 210 can be a blank sheet with no holes. The operator may insert test fabric 210 before entering calibration mode. The test fabric 210 may also have a black backing material behind a white top. The black backing fabric can fill in the holes created by the needle, providing high contrast features for later vision calibration.

Thereafter, the operator can initiate calibration. For example, the operator may press a button (F1 key) on the operator panel to begin calibration. The calibration mode can include two phases. Two-phase calibration can be advantageous in various embodiments due to the protocol of the interface between guiding apparatus 100 and the sewing machine's 110 control board.

Figure 7:
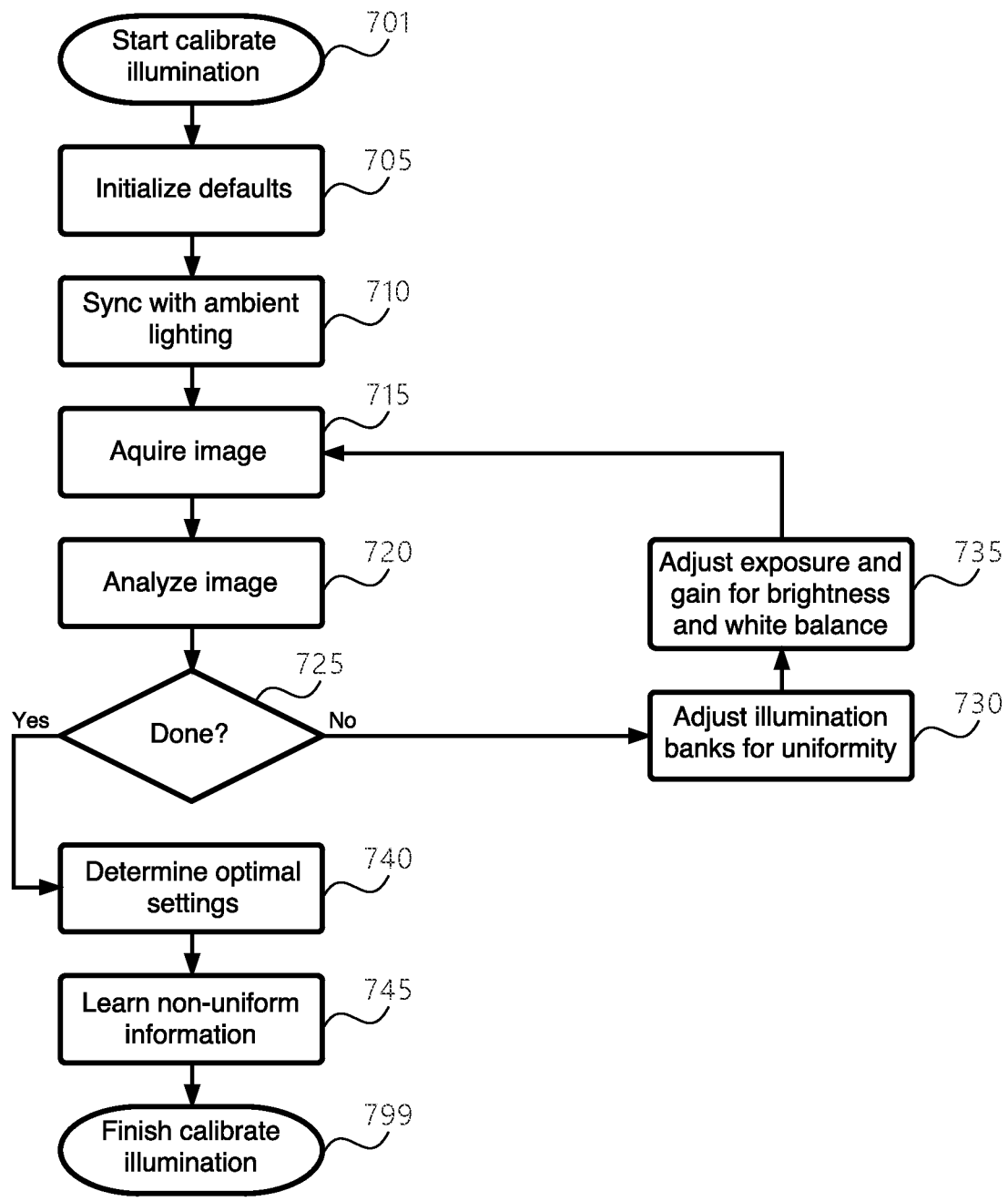
FIG. 7 is a flowchart related to an illumination calibration method consistent with various embodiments of the present disclosure.

Accordingly, at stage 700, method 600 can enter a first phase, which is the calibrate illumination mode shown in FIG. 7. At stage 625, calibration success is checked. If phase 1 of calibration is not successful, then an operator may adjust settings at stage 630 and then return to stage 700, repeating the method shown in FIG. 7. However, if phase 1 of calibration is successful, then process may proceed to phase 2 of calibration mode shown in FIG. 8. The operator may initiate phase 2 by pressing a button (such as F2 key). The method 600 may then enter phase 2 calibration.

In preparation for the phase 2 calibration, in some embodiments a grid pattern may be generated at stage 635. A grid pattern can be a uniform grid of dots that fits within the workspace, while maintaining a clear border region around the grid and the clamping mechanism. The grid pattern's sewfile can be sent for sewing at stage 640, and the grid sewn (possibly threadlessly) at stage 645. This may involve the needle poking a series of holes in a grid pattern (as shown in FIG. 2).

Figure 8:
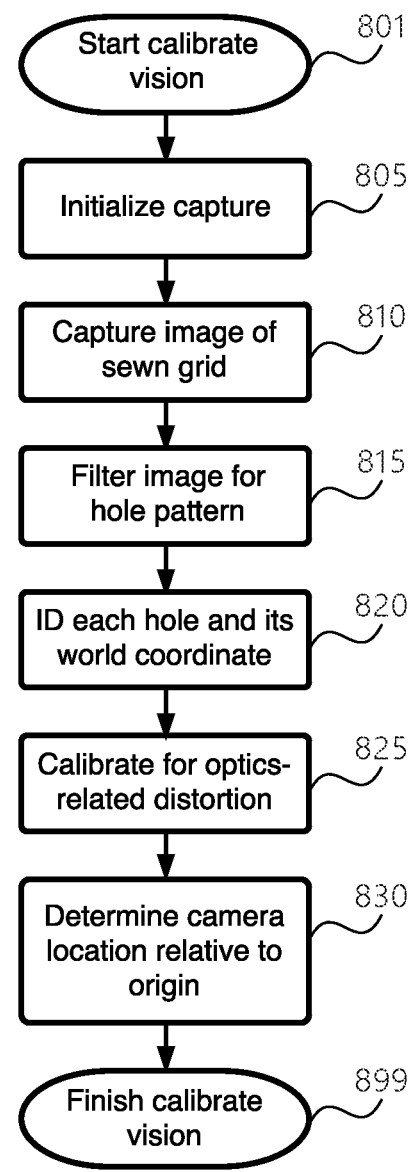
FIG. 8 is a flowchart related to a vision calibration method consistent with various embodiments of the present disclosure.

Apparatus 100 may then move to inspection position at stage 650, whereafter the second phase, which is the calibrate vision mode shown in FIG. 8, can commence at stage 800. This can involve a "Check" stage to determine how the calibration grid pattern matches up with the expected results. If the phase 2 of calibration is not successful, then the method shown in FIG. 8 may be repeated. If successful, method 600 may conclude at stage 699. Prior to finishing, an operator may provide a "Final OK" (e.g., for safety purposes). For example, the operator may press a foot pedal to give the final OK command.

700. Calibrate Illumination

FIG. 7 is a flowchart related to a calibration method 700 consistent with various embodiments of the present disclosure. Method 700 can comprise a first calibration phase of method 600. Method 700 may begin at stage 701. It can be initiated by an operator; for example, the operator may press the F1 key to initiate phase 1. If the calibration mode is active, then phase 1 begins. One goal of phase 1 can be to calibrate the lighting/illumination of the guiding apparatus. This may include controlling lighting units and making illumination as uniform as possible, such that vision system sees white paper.

At stage 705, apparatus 100 can initialize defaults. At stage 710, lighting units can be synced with the frequency of ambient lighting (which may be subject to oscillations related to, e.g., the 50 Hz or 60 Hz frequency of the power grid). Next, at stage 715, apparatus 100 can acquire an image of the white paper via camera of the guiding apparatus. The image parameters can then be analyzed at stage 720 to determine whether the acquired image is acceptable (whether illumination is sufficiently uniform, proper white balance, etc.). If the image is determined at stage 725 to have an issue—for example, insufficiently uniformity or too dark—adjustments can be made to illumination banks at stage 730 (to improve uniformity) and to exposure and gain at stage 735 (to improve brightness and white balance). Other adjustments may be made as well. Method 700 can then return to stage 715, and further iterations of adjustments made if necessary. In various embodiments, adjustments are made until certain threshold parameters are met for one or more of exposure, gain, and intensity.

Thereafter, based on the adjustments made, the method 700 can compute optimal values for exposure, gain, and intensity at stage 740. The calculated values may be received, and reported back for next command. At stage 745, the system can learn and retain non-uniform illumination information—i.e., that which can't be corrected by adjustment stages 730, 735, or others (if any). Method 700 may conclude at stage 799.

800. Calibrate Vision

FIG. 8 is a flowchart related to a calibration method 800 consistent with various embodiments of the present disclosure. In some embodiments, calibration stages (calibrate illumination, calibrate vision, and potentially other calibration stages like calibrate AR) may be performed in one phase, in a different order, or with additional or fewer stages. The method 800 can include an operator initiating the phase 2. For example, the operator may press the F2 key to initiate phase 2. If the calibration mode is active, then the phase 2 may begin at stage 801.

The method 800 may include initializing image capture at stage 805 and acquiring an image of the sewn grid at stage 810 to verify Illumination to make sure no variables were changed since phase 1 calibration. The acquired image can be filtered at stage 815 to accentuate the hole pattern. Then at stage 820 each hole and its world coordinate can be uniquely identified. In some embodiments, hole patterns may be supplemented or replaced by other pattern elements, such as AR projections or other indicia. In such embodiments, coordinates can be identified for these pattern elements.

Based on the image and world coordinates of the identified dots or pattern elements, the method 800 can include performing one or both of calibrating for distortion caused by the optics at stage 825, and determining the location of the camera relative to the origin of the sewing machine workspace (needle) at stage 830. Finally, vision calibration may conclude at stage 899.

900. Sew Patch(es)

Figure 9:
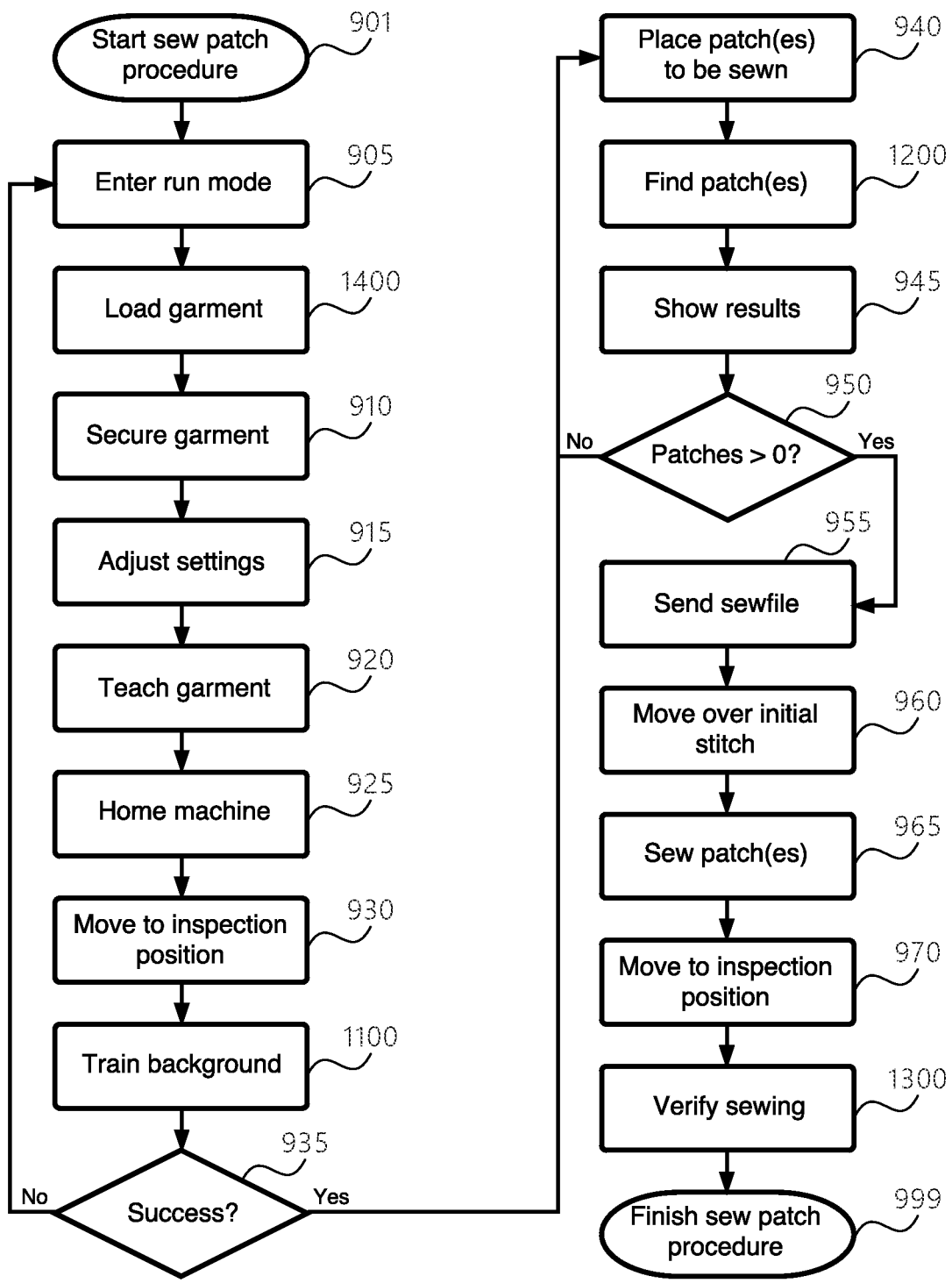
FIG. 9 is a flowchart related to a patch sewing method consistent with various embodiments of the present disclosure.

FIG. 9 is a flowchart related to a patch sewing and inspection method 900 consistent with various embodiments of the present disclosure. Method 900 can include actually stitching a badge to the substrate fabric. In various embodiments, an operator can determine if the machine 110 was calibrated properly by seeing how the badge was stitched to the fabric.

Method 900 may begin at stage 901, entering run mode at stage 905. An operator can load a garment at stage 1400, according to the method illustrated in FIG. 14. An operator or the system may then adjust settings at stage 915, after which the system can be taught the garment at stage 920. At stage 925 the machine can home, and then at stage 930 move to an inspection position. The guiding apparatus 100 can then train the background of the garment at stage 1100, according to the method illustrated in FIG. 1100. If training is determined at stage 935 to have been unsuccessful, method 900 can return to an earlier stage (e.g., stage 905) to iterate on the process toward a successful background training.

If background training was successful, the one or more patches to be sewn can be placed and oriented at stage 940. At stage 1200, the vision system of the apparatus 100 can implement a find patches method as illustrated in FIG. 1200. The system may then show the results of stage 1200 patch finding at stage 945. If, at stage 950, it is determined that no patches were found, method 900 can return to stage 940 to place and properly orient patches to be sewn. If there is at least one patch found, apparatus 100 can send the sewfile to machine 110, move over the initial stitch at stage 960, and sew the one or more patches to the garment at stage 965. Following sewing, apparatus 100 can move into inspection position at stage 970. Sewing can be verified at stage 1300, according to the method illustrated in FIG. 13.

If sewing does not verify, remedial stages may be taken, including returning to any appropriate stage or sub-process of method 900. The sew patch(es) method 900 may conclude at stage 999.

1000. Sew Patch(es)

Figure 10:
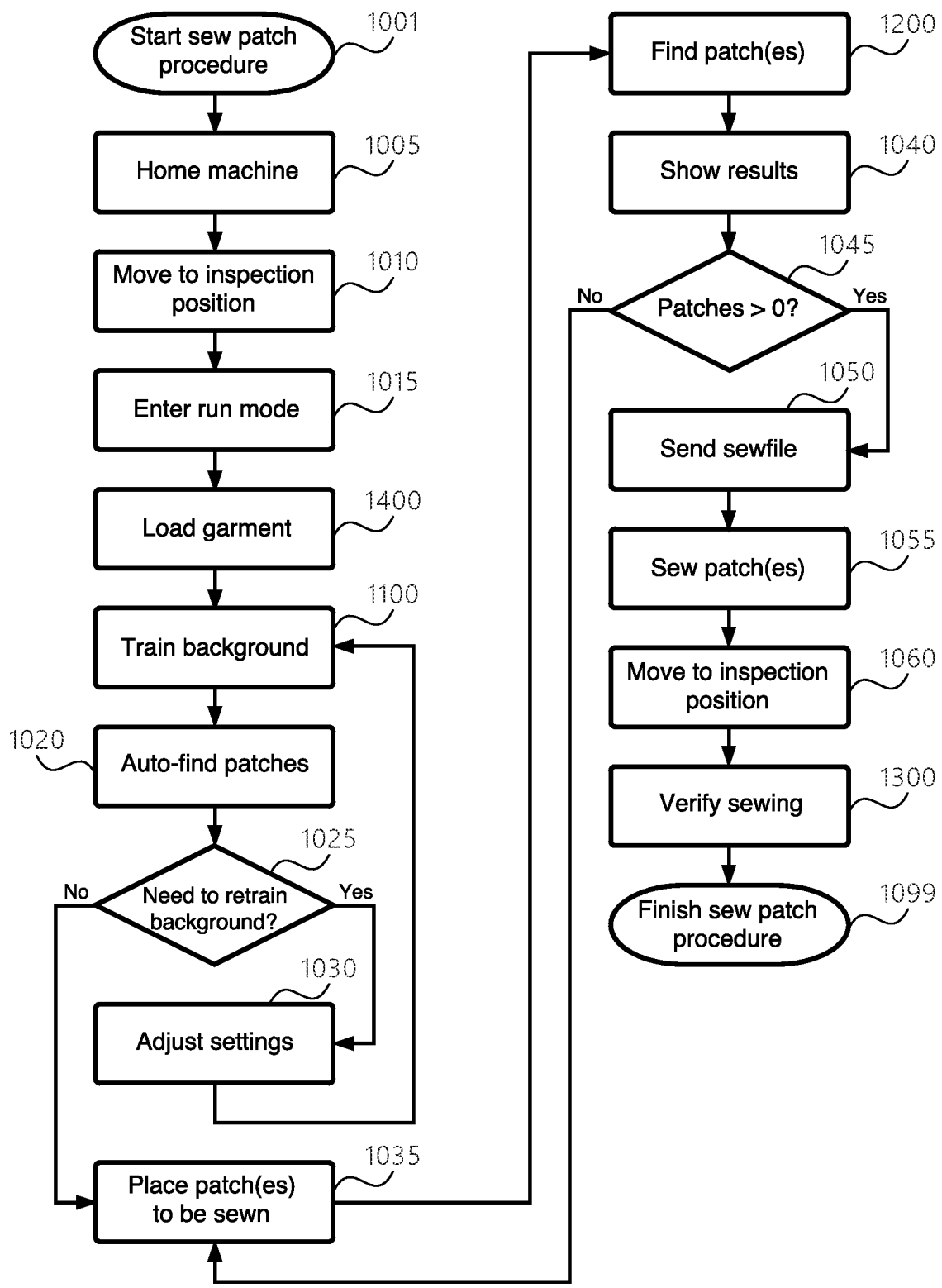
FIG. 10 is a flowchart related to another patch sewing method consistent with various embodiments of the present disclosure.

FIG. 10 is a flowchart related to a patch sewing and inspection method 1000 consistent with various embodiments of the present disclosure. Method 1000 is similar to method 900, differing in that some stages may be performed in a different order, and some stages may be performed in conformance with different embodiments (having e.g., a greater amount or different mode of automation).

Method 1000 may begin at stage 1001 and may commence with machine homing at stage 1005 (stage 925 in method 900), followed by moving to inspection position at stage 1010 (c.f. stage 930). Next, at stage 1015, the system can enter run mode 1015, followed by garment loading at stage 1400 (according to FIG. 14) and background training at stage 1100 (according to FIG. 11).

Method 1000 can include an auto-find patches process at stage 1020. This can be used in conjunction with a patch library (whereby the correct patch(es) for this sewing job, and their parameters, may be stored), in embodiments comprising such a feature. In various embodiments, this stage and others in method 1000 may be performed in conjunction with an augmented reality projection system. For example, patches may be auto-found in a patch library and guides therefor projected onto the substrate to facilitate patch placement.

At stage 1025, background training can be assessed, and if further training/retraining is determined necessary, an operator or the system can adjust settings at stage 1030 and return to stage 1100 for iterative training and adjustment. If no retraining is necessary, at stage 1035 the patch(es) to be sewn can be placed. As with method 900, a find patches stage 1200 can be performed, followed by results 1040, and determination of at least one found patch 1045 (which returns to stage 1035 for placement if no patches are found). If at least one patch is found, apparatus 100 can send the sewfile 1050 and sew the patch(es) 1055.

Figure 13:
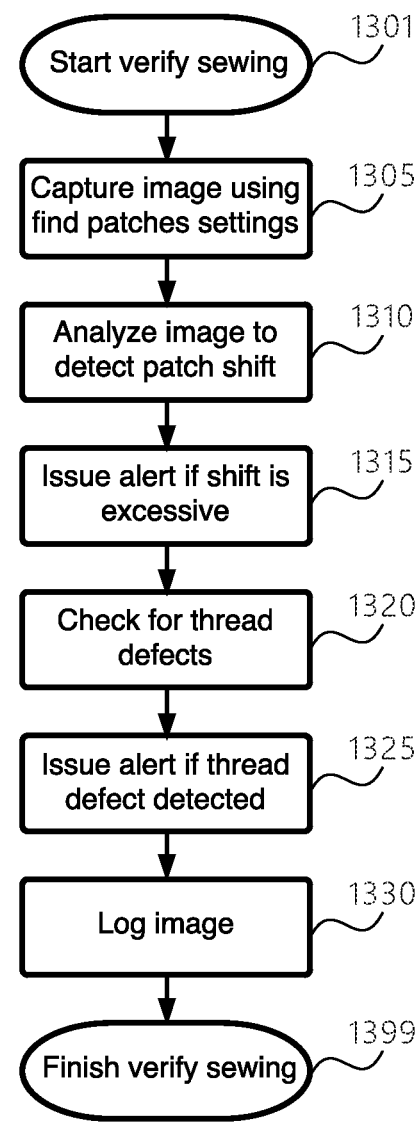
FIG. 13 is a flowchart related to a sewing verification method consistent with various embodiments of the present disclosure.

Following sewing, at stage 1060, apparatus 100 can move into inspection position and verify sewing at stage 1300 (according to FIG. 13). Remedial stages may be taken if necessary, and method 1000 may conclude at stage 1099. It should be noted that methods 900 and 1000, along with sew patch methods extant in various embodiments, may return to load additional badges or new garments, as many times as necessary.

1100. Train Background

Figure 11:
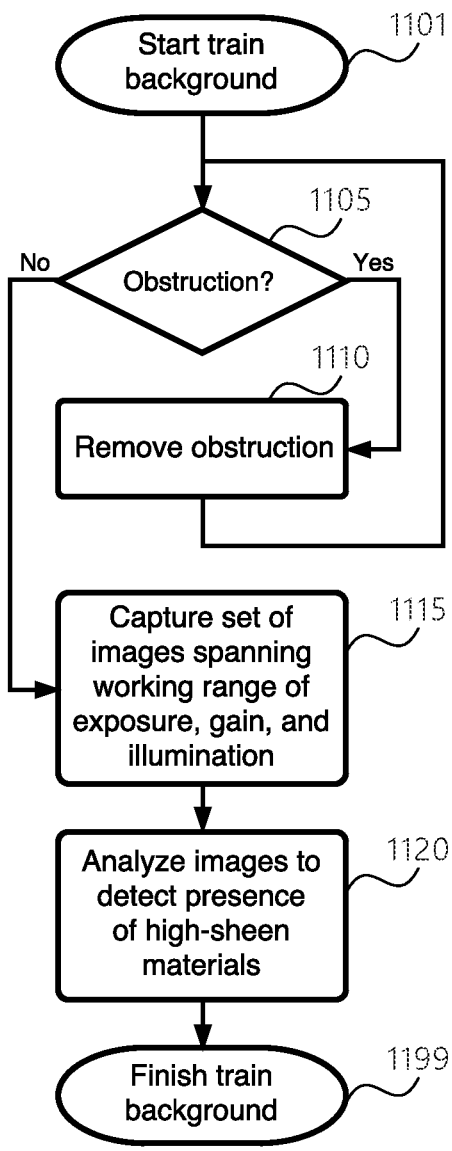
FIG. 11 is a flowchart related to a background training method consistent with various embodiments of the present disclosure.

FIG. 11 is a flowchart related to a background training method 1100 consistent with various embodiments of the present disclosure. The teaching method 1100 can be used to make sure the sensors of the guiding apparatus 100 can distinguish the background fabric (e.g., a color/texture/pattern) with the material of the badge to be stitched on to the fabric. Essentially, this is to ensure the optical sensors and illumination components are properly optimized for the fabric type. Once the guiding apparatus 100 knows the fabric type, it can better detect the badge overlaid on the fabric and more accurately stitch the badge to the fabric. Further, in various, the teaching stage may be performed once for each batch of fabrics, and does not need to be performed each time.

Method 1100 may begin at stage 1101. At stage 1105, an operator or the system can determine whether an obstruction is found in the workspace, such as the operator's hands, a stray piece of fabric, or debris. If an obstruction is found, it may be removed at stage 1110 and the process started again at stage 1105. If no obstruction is found, at stage 1115 a set of one or more images can be captured by a camera system of apparatus 100. The image set may cover a range of parameter values as respects the workspace—such as exposure values, gain values, and illumination values. In various embodiments, a goal may be to cover a large swath or the entirety of the parameter space of operating conditions and possible illumination conditions.

At stage 1120, the image set can be analyzed to detect the presence of e.g., high-sheen materials that may interfere with the vision system. At this stage, other visually problematic conditions may be detected, such as transparency, translucency, reflectivity, or perspective-variant visual characteristics (e.g., chromaticity). Method 1100 may conclude at stage 1199.

1200. Find Patch(es)

Figure 12:
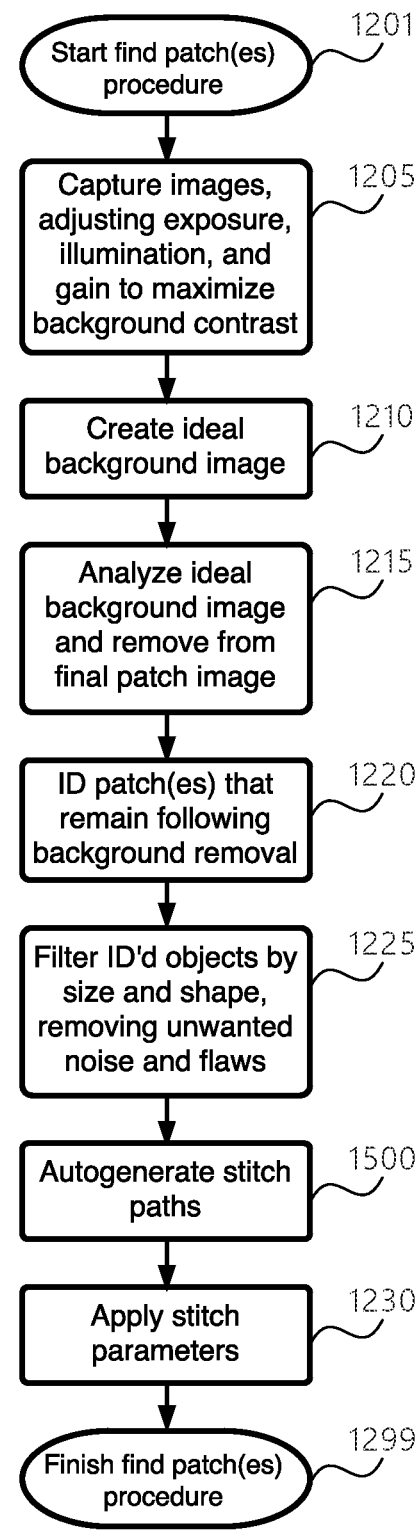
FIG. 12 is a flowchart related to a patch finding method consistent with various embodiments of the present disclosure.

FIG. 12 is a flowchart related to an operation method 1200 consistent with various embodiments of the present disclosure. The operation method 1200 can include sensors detecting a badge overlaid on the fabric, and then controlling the sewing machine to automatically sew the badge onto the fabric. In a further, the operation method 1200 may include providing real-time, self-correction for correcting the position of the needle when it gets off the desired path along a fabric.

Method 1200 may begin at stage 1201, whereupon apparatus 100 can capture images of the workspace at stage 1205. Parameters such as exposure, illumination, and gain may be adjusted for optimal patch recognition (e.g., contrast with background material). At stage 1210 an ideal background image can be generated, and the image can be processed for removal at stage 1215 to remove background features (e.g., colors, patterns) from the image—again maximizing patch isolation from extraneous background features.

Method 1200 can then at stage 1220 identify one or more patches remaining following background removal in stage 1215. The ID'd patch(es) may then be filtered by size and shape at stage 1225 to remove unwanted noise and flaws. In various embodiments consistent with an apparatus 100 having a patch library feature, ID'd patches may be matched against known patches in the library. At stage 1500, stitch paths may be autogenerated in accordance with the stages illustrated in FIG. 15. Stitch parameters may be applied at stage 1230. Method 1200 may conclude at stage 1299.

1300. Verify Sewing

FIG. 13 is a flowchart related to a verification method 1300 consistent with various embodiments of the present disclosure. The method 1300 can help in quality checks on an on-going basis. The method 1300 may begin at stage 1301, and can next proceed to capturing image an image at stage 1305. The image can be analyzed at stage 1310 to detect shift of sewn patch(es). If patch(es) are shifted too much, then the operator may be alerted to indicate possible maintenance issues at stage 1315. This shifting can occur due to many factors, such as improper tacking of patch to background material prior to sewing, or background material stretching or drawing up as patch(es) are sewn. Thereafter, the method 1300 can include a stage 1320 checking for thread defects, such as thread breakage, and alert the operator as to any potential maintenance issues at stage 1325. The images and analyzes performed by method 1300 may be logged for customer quality system at stage 1330. Method 1300 may conclude at stage 1399.

1400. Load Garment

Figure 14:
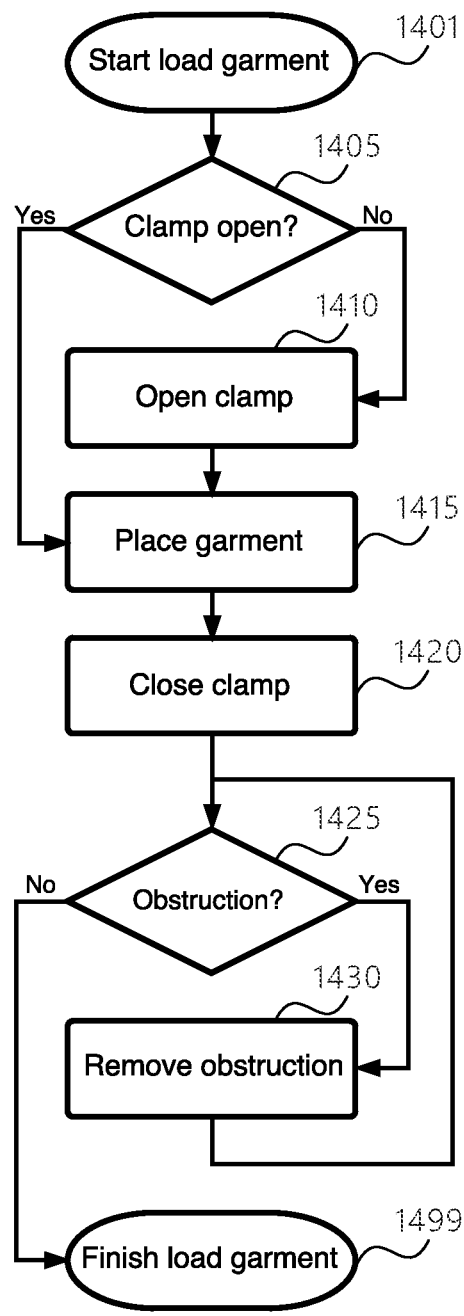
FIG. 14 is a flowchart related to a garment loading method consistent with various embodiments of the present disclosure.

FIG. 14 is a flowchart related to a garment loading method 1400 consistent with various embodiments of the present disclosure. Loading may begin at stage 1401. At stage 1405, an operator, or apparatus 100, can determine if a clamp (or similar securing mechanism) is open or otherwise available to load a garment. If the clamp is not open, at stage 1410 the clamp can be opened, after which method 1400 returns to stage 1405.

If the clamp is open, at stage 1415 a garment can be placed and oriented in the workspace. At stage 1420 the clamp can be closed to secure the garment. At stage 1425 an operator, or apparatus 100 (e.g., in a configuration employing a virtual light curtain), can determine if there are any obstructions in the workspace that might interfere with sewing processes. If so, at stage 1430, any obstructions can be cleared and method 1400 can return to stage 1425, and may conclude at stage 1499.

Loading and unloading operations may be automated by operation of features of various embodiments, such as virtual light curtain, gesture recognition, or interaction with an augmented reality system (projected or otherwise).

1500. Autogenerate Stitch Paths

Figure 15:
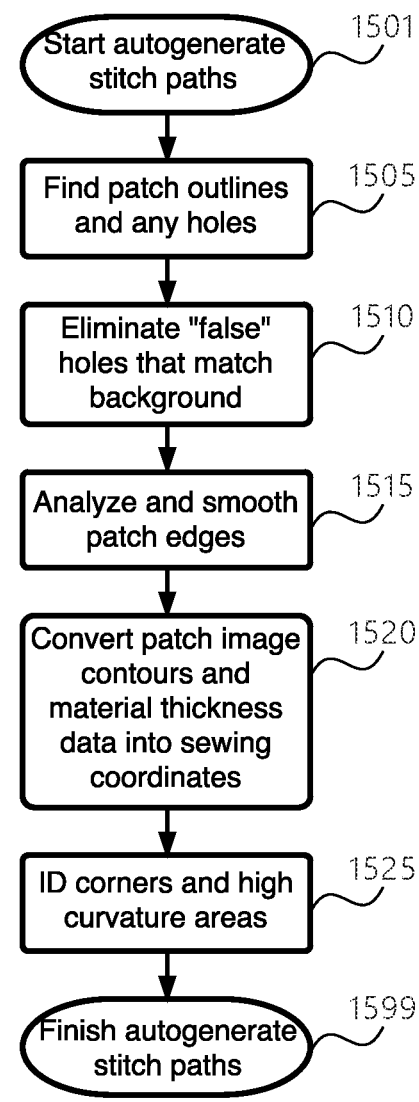
FIG. 15 is a flowchart related to a stitch path generation method consistent with various embodiments of the present disclosure.

FIG. 15 is a flowchart related to a stitch path generation method 1500 consistent with various embodiments of the present disclosure. The method 1500 may begin at stage 1501. At stage 1505, apparatus 100 can find patch outlines (contours, edges) and any holes. At stage 1510, the system can determine any "false" holes that the vision system incorrectly identified as part of the garment. One reason this might happen is a color match between that area of the patch and the background material. Other reasons might include patch surface qualities (e.g., sheen, reflectiveness, specularity) or topological complexity. Determination of false holes may be achieved in a mono-vision system. Alternatively or in addition, such a determination may be made in embodiments with 3-D, stereoscopic, MPMV, or motion-based vison aspects.

At stage 1515, smooth patch edges can be analyzed. At stage 1520, patch image, contours, and potentially material thickness data (manually or automatically generated) can be converted into sewing coordinates suitable for sewing by machine 110. At stage 1525, corners and areas of high curvature may be identified so that the system can take appropriate stages to sew potentially problematic areas. Method 1500 may conclude at stage 1599.

1600. Patch Tacking

Figure 16:
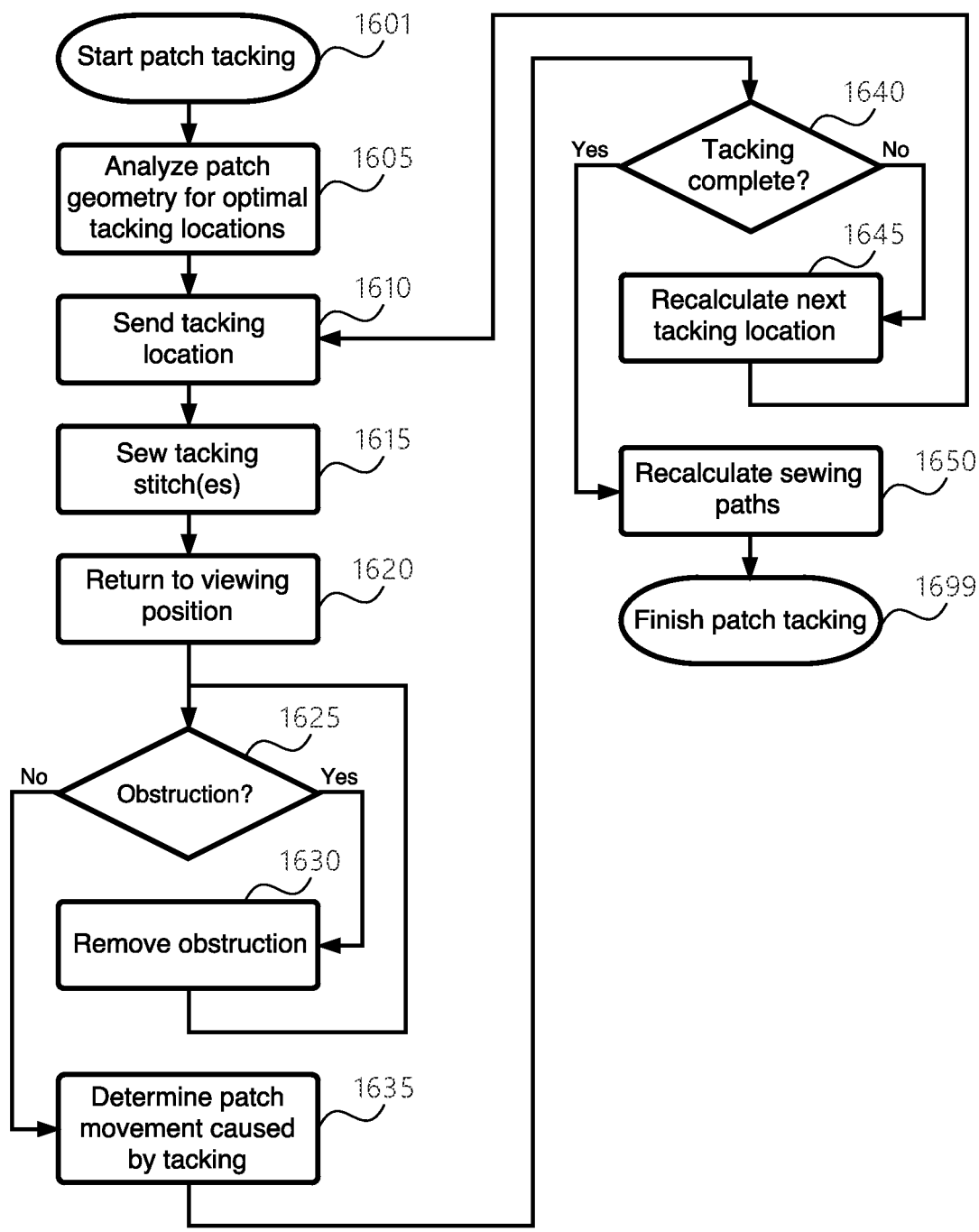
FIG. 16 is a flowchart related to a patch tacking method consistent with various embodiments of the present disclosure.

FIG. 16 is a flowchart related to a patch tacking method 1600 consistent with various embodiments of the present disclosure. In some sewing practices, adhesive is used as a preliminary holding mechanism to secure a patch for final sewing. There can be instances where the adhesive used to hold a patch in place during sewing builds up on the needle and thread, requiring periodic cleaning by the operator to prevent thread breakage or reduced quality stitching. As is the case throughout the present disclosure, the term "patch" may comprise objects of any material (textiles, elastics, rubbers, polymers, metallic materials, ceramic materials, composite materials, electronic or semiconductor materials, biocompatible materials, mixed materials, etc.), shape (polygons, rounded or curved shapes, irregular shapes, holes, cutouts, etc.), and dimensionality (flat objects, multi-layer and "raised feature" objects, 3-dimensional objects, etc.).

To prevent patch motion and unwanted adhesive buildup during sewing, apparatus 100 can in various embodiments perform tacking operations wherein the vision system analyses the patch, determines locations to perform a tacking operation (i.e., sew a few stitches), to hold a location in place. Apparatus 100 may then re-image the patch to detect any motion, and perform additional tacking if necessary, repeating these stages until enough tacking has been performed to adequately hold the patch in place for a more durable or final continuous sewing operation. In various embodiments, a vision system of apparatus 100 can account for patch movement between individual tacking operations as they're performed on a patch. Method 1600 may be used with or without an underlayer of adhesive.

In an example, method 1600 can be used in cases where tightly coupled communication between the machine 110 and the vision system is not possible, preventing real-time path adjustment during sewing. In another example, method 1600 may be used in combination with other methods disclosed herein, including embodiments having adequate communication between the machine 110 and vision system. In an embodiment, a vision system may comprise one or more cameras; in embodiments comprising more than one camera, the vision system may be capable of stereoscopic vision, and such capability may help better ascertain optimal tacking locations and patch movement or patch stretching following one or more tacking operations.

In yet another example, a tacking operation such as method 1600 may be employed in order to mitigate (or provide additional protection against) possible stretching and movement of a badge during sewing operations. Consistent with the above examples, a tacking operation might stitch, in succession, each of a plurality of corners of a patch, with the apparatus 100 accounting throughout for movement or stretching occurring due to tacking stages.

In embodiments consistent with an apparatus 100 comprising a patch library, method 1600 might be performed at known spots stored in the library for a recognized patch. Likewise, for an unrecognized patch, method 1600 might be performed in successive imaging-tacking-reimaging stages.

1700. Calibration

Figure 17:
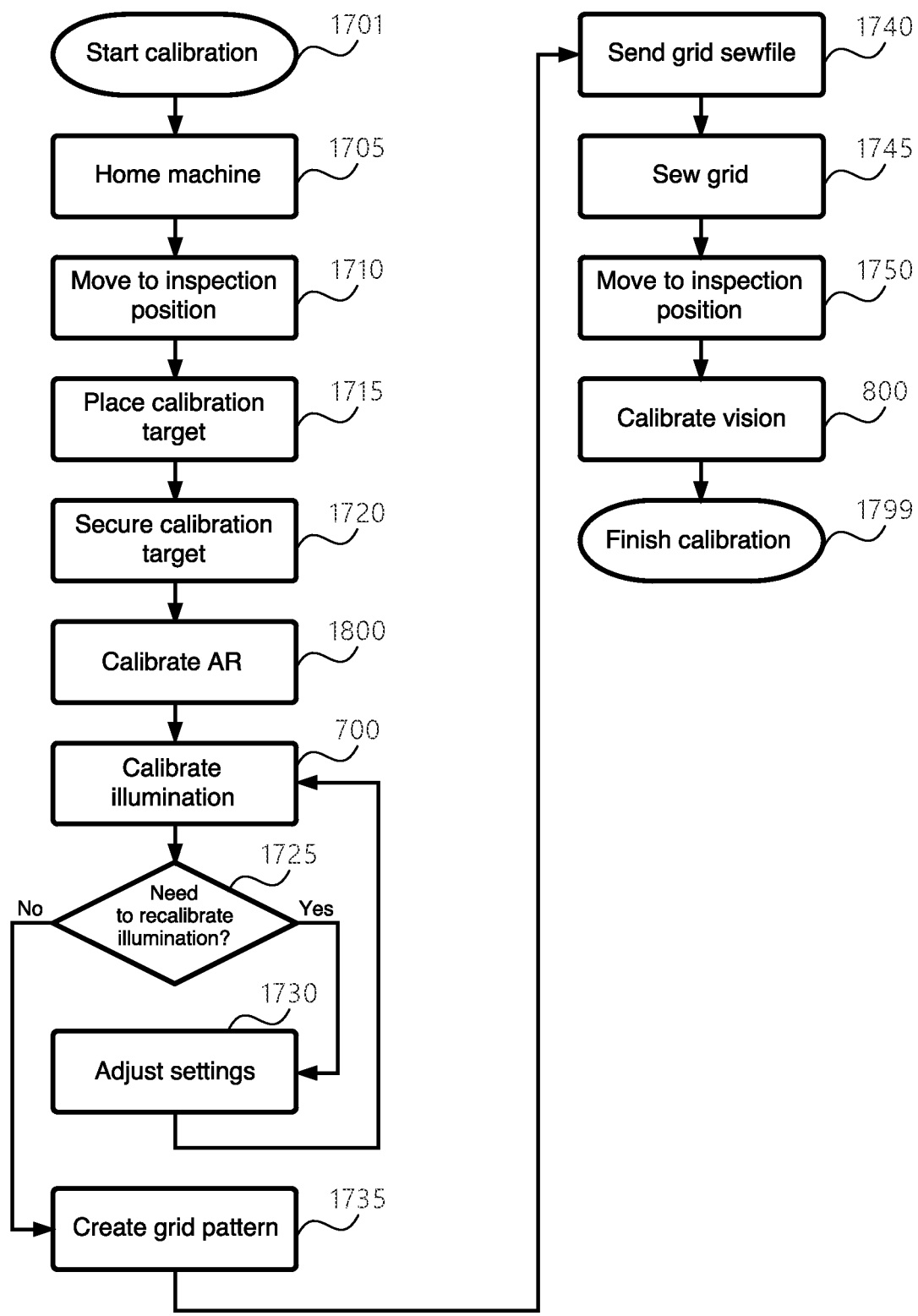
FIG. 17 is a flowchart related to another calibration method consistent with various embodiments of the present disclosure.

FIG. 17 is a flowchart related to a calibration method 1700 consistent with various embodiments of the present disclosure. In various embodiments, method 1700 can be employed in the context of an augmented reality or projection system. Such a system may be used to project assistive features into the workspace, such as patterns, guides, system status information, or virtual controls.

Figure 18:
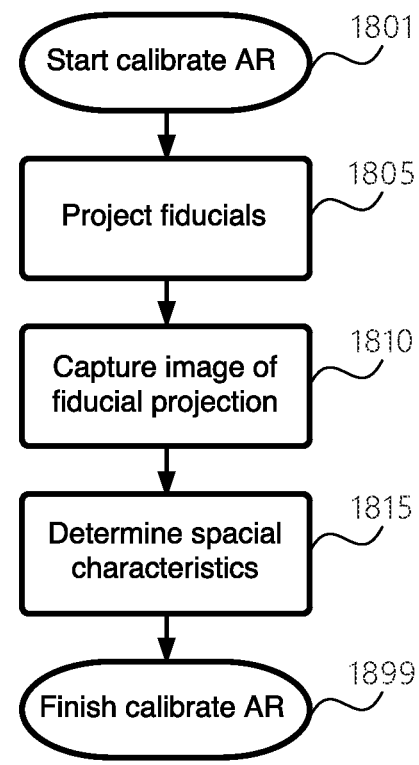
FIG. 18 is a flowchart related to a projection system calibration method consistent with various embodiments of the present disclosure.

Many embodiments can utilize one or more calibration stages that seek to achieve optimal workspace qualities for a vision system. In addition to, in combination with, instead of, before, during, or after such calibration stages, apparatus 100 may perform a calibration of an augmented reality system. In various embodiments, such a calibration can be consistent with method 1800 as illustrated in FIG. 18. In various embodiments, method 1700 may proceed in similar fashion to method 600 as illustrated in FIG. 6. while including the addition of one or more AR calibration stages.

Method 1700 may be utilized in embodiments consistent with an apparatus 100 having a 3-D/depth-sensing/stereoscopic vision system. For example, spatial information about the topology of items in the workspace may inform the system about the proper calibration of augmented reality features, projection coordinates, lighting parameters, etc.

1800. Calibrate AR

FIG. 18 is a flowchart related to a calibration method 1800 consistent with various embodiments of the present disclosure. Method 1800 may begin at stage 1801. At stage 1805, apparatus 100 can project fiducials or other spatial indicia onto the workspace. At stage 1810, apparatus 100 can capture one or more images of the workspace with projected fiducials. Calibration can involve adjustment of individual projection elements, and/or the qualities of one or more projected fiducials. Calibration may involve iterative stages of adjustment and imaging/observation.

From the captured imagery, the system may be able to calculate coordinates and parameters for locations in the workspace at stage 1815. Method 1800 may conclude at stage 1899. Such spatial information may be used on its own or combined with other calibration data. In various embodiments, AR calibration data can assist an apparatus 100 in projecting accurate guides and other assistive information onto the workspace.

1900. Sew Patch(es)

Figure 19:
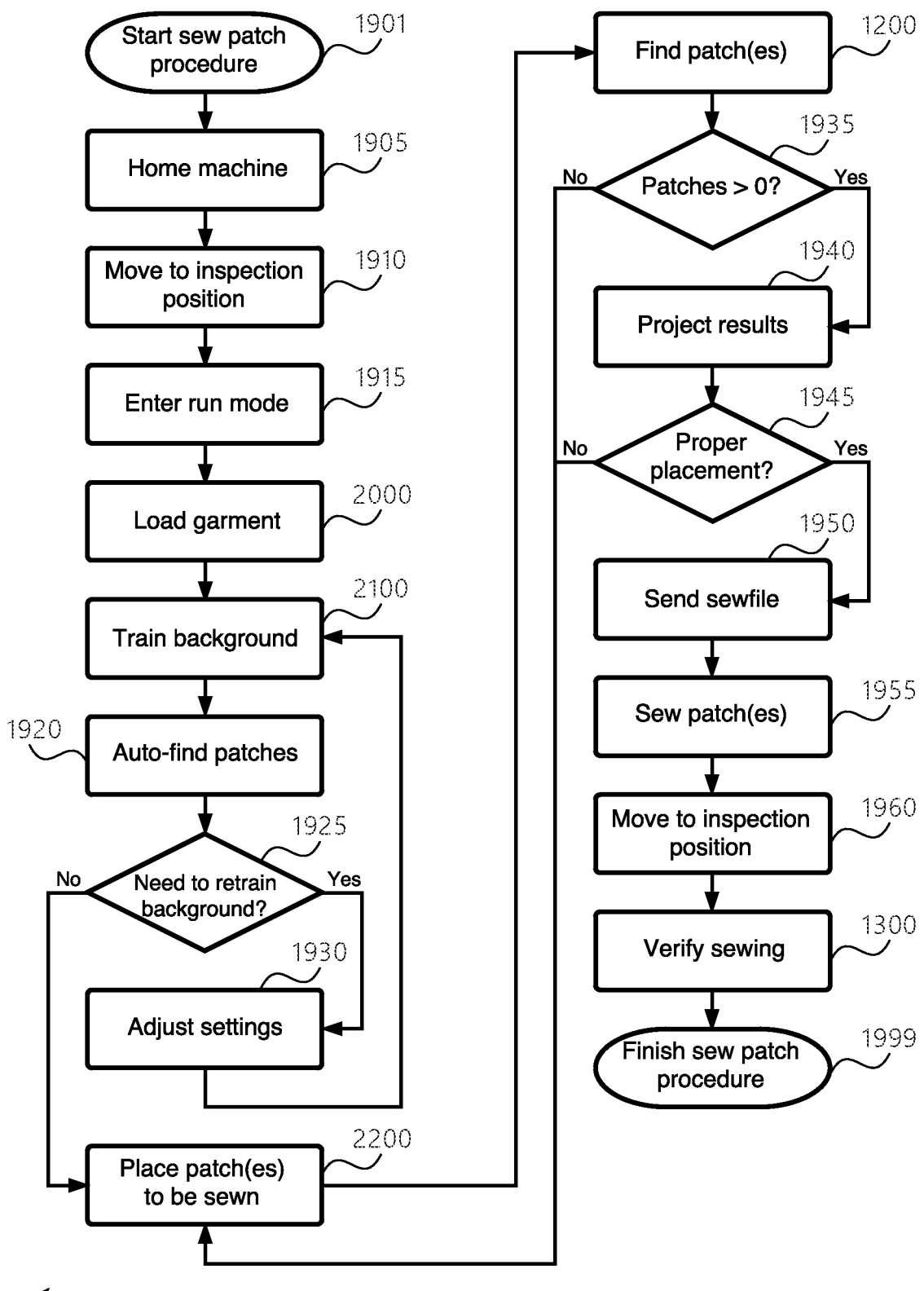
FIG. 19 is a flowchart related to yet another patch sewing method consistent with various embodiments of the present disclosure.

FIG. 19 is a flowchart related to a patch sewing and inspection method 1900 consistent with various embodiments of the present disclosure. In various embodiments, method 1900 may proceed in similar fashion to method 1000 as illustrated in FIG. 10. while including the addition of one or more augmented reality-assisted stages.

Figure 20:
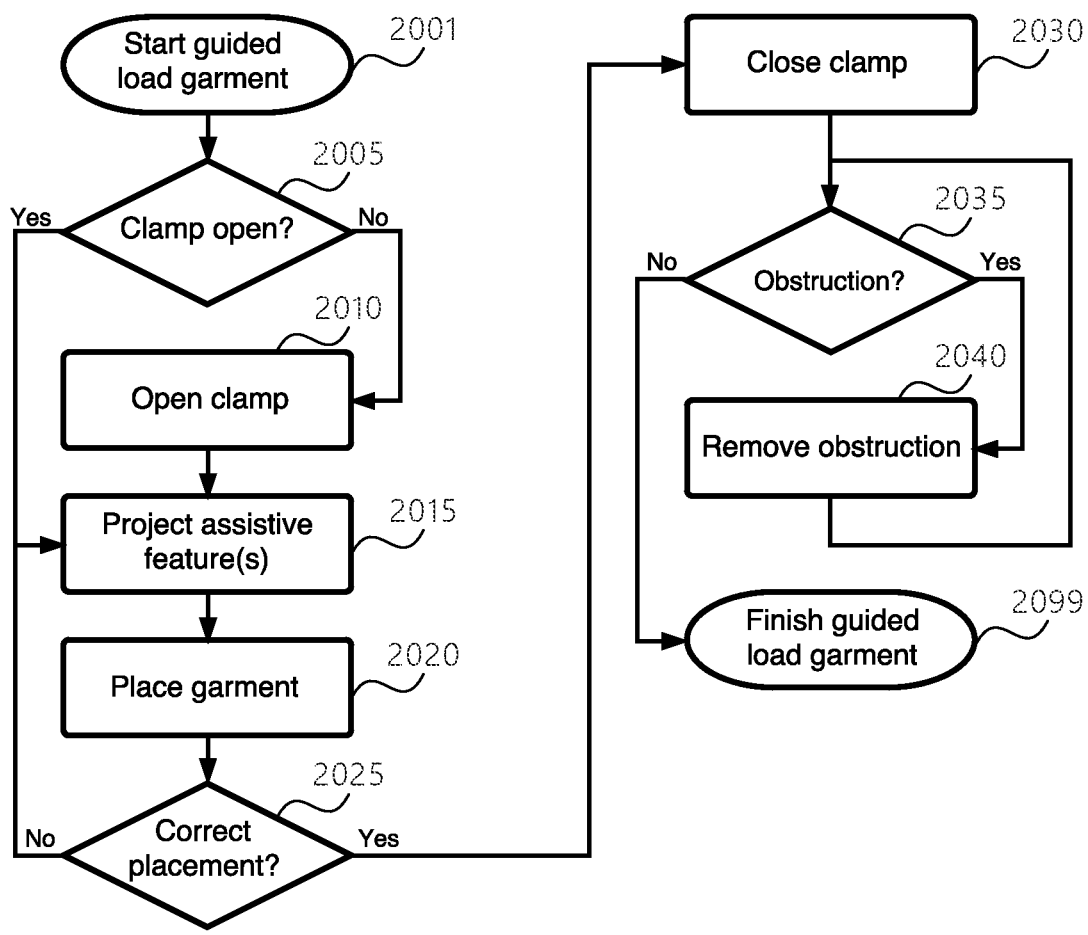
FIG. 20 is a flowchart related to a guided garment loading method consistent with various embodiments of the present disclosure.
Figure 21:
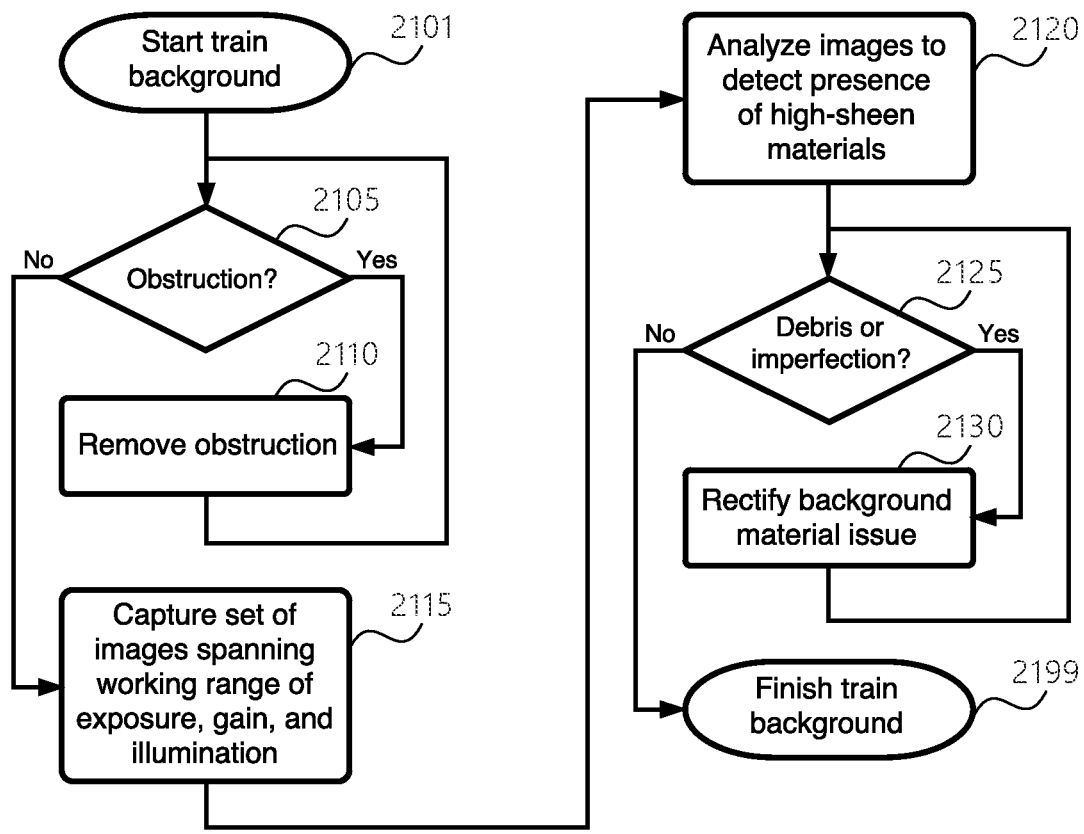
FIG. 21 is a flowchart related to another background training method consistent with various embodiments of the present disclosure.
Figure 22:
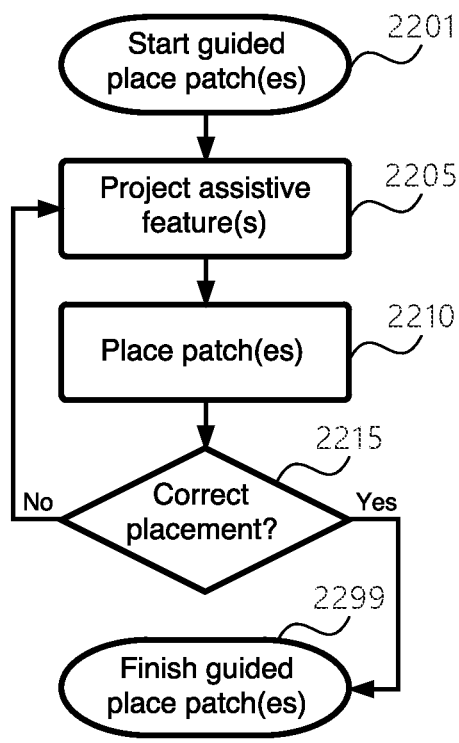
FIG. 22 is a flowchart related to a guided patch placement method consistent with various embodiments of the present disclosure.

For example, method 1900 may employ a load garment stage such as method 1400 as illustrated in FIG. 14. The load garment stage may be "guided" as in method 2000, as illustrated in FIG. 20. For another example, method 1900 can employ a train background stage such as, for example, method 1100 as illustrated in FIG. 11, or a method 2100 as illustrated in FIG. 21. Method 1900 may comprise a guided place patches stage such as method 2200 as illustrated in FIG. 22.

Embodiments consistent with an apparatus 100 comprising an AR system may be of particular benefit when operating on expensive garments or substrates, as the assistive features may improve the quality and consistency of the final sewn item. Such AR systems may also lower costs and improve cycle speed due alleviating the need for certain special tooling configurations, as well as due to waste and error. In embodiments that comprise the ability to visually present, within the working are of the machine 110, textual or other status information/indicators to the operator, such "heads up" style presentation may be beneficial to operators. One reason is that the operator may not have to look away from the workspace to view (and in some embodiments, interact with) machine 110 controls.

In an example, an AR system might project a certain symbol, color, or textual warning to alert an operator to "keep hands clear" during a sewing operation. In another example, after performing a verify sewing operation at stage 1300 (as illustrated in FIG. 13), an AR system may project information about the results of the verification and may highlight any issues found.

Embodiments comprising AR features may also interact with other features of a guiding apparatus 100. For example, AR may involve or interact with a gesture recognition feature. This may be beneficial, for example, when using the AR projections as a "virtual keyboard" with which the operator might interact on or about the surface of the workspace/garment.

Augmented reality systems may, in some embodiments, be achievable with—or integral within—an extant visual system (optics, lighting, sensors, etc.) In other embodiments, AR features may necessitate one or more additional, dedicated, or discrete components.

Projections may be monochromatic or colored, and may include features that are straight, curved, irregular, text-based, temporal (e.g., blinking), etc. Projections in various embodiments may be made with visible light, infrared light, other electromagnetic radiation. Embodiments may comprise augmented reality features that are visible to the naked eye. Some embodiments may comprise AR features that are visible through an AR viewport such as a smartphone configured for VR/AR use.

Some stages of method 1900 may be performed out of order and/or combined. For example, a substrate loading procedure could include simultaneous projection of garment loading guides and patch loading guides, such that both may be loaded during the same stage (e.g., to reduce steps and save time).

2000. Guided Load Garment

FIG. 20 is a flowchart related to a garment loading method 2000 consistent with various embodiments of the present disclosure. Method 2000 may be utilized in various embodiments consistent with an apparatus 100 comprising an AR system. Method 2000 can project assistive features onto a workspace in order to guide the loading of a garment (generally, an article, substrate, piece of fabric, object, etc.) in the proper location and orientation vis-a-vis the machine's 110 workspace.

2100. Train Background

FIG. 21 is a flowchart related to a background training method 2100 consistent with various embodiments of the present disclosure. In various embodiments, method 2100 may proceed in similar fashion to method 1100 as illustrated in FIG. 11. while including the addition of one or more stages of detecting debris, blemishes, or other objectionable imperfections. If removable (as with a stray piece of thread), such can be removed. If not (as with a grease stain), an operator may load a new substrate so as to provide an accurate exemplar.

Method 2100 may be employed in a system consistent with AR, virtual light curtain, gesture recognition, etc. to detect a stray hand or other debris—and possibly issue/project an "in situ" warning in the workspace.

Generally, operations like stage 2125 may be employed at various points, in various methods, in various embodiments of the present disclosure. Apparatus 100 may employ such a check, e.g., during a sewing operation process to prevent the waste of a patch being sewn onto a garment that would not end up passing quality control.

2200. Guided Place Patch(es)

FIG. 22 is a flowchart related to a patch placement method 2200 consistent with various embodiments of the present disclosure. Method 2200 may be utilized in various embodiments consistent with an apparatus 100 comprising an AR system. Method 2200 can project assistive features onto a workspace in order to guide the placement of a patch in the proper location and orientation vis-a-vis the substrate.

AR assistive features can be beneficial even with the placement of a relatively simple patch objects such as a single rectangular tag or a pocket. AR assistive features may be of even greater benefit when placing multiple and or/complex patches, such as jersey lettering. Apparatus 100 may thus provide visual guidance to an operator (or, as is generally possible in various embodiments, to another apparatus or automated system) as to correct order, location, and orientation of patches.

2300. Train Patch Library

Figure 23:
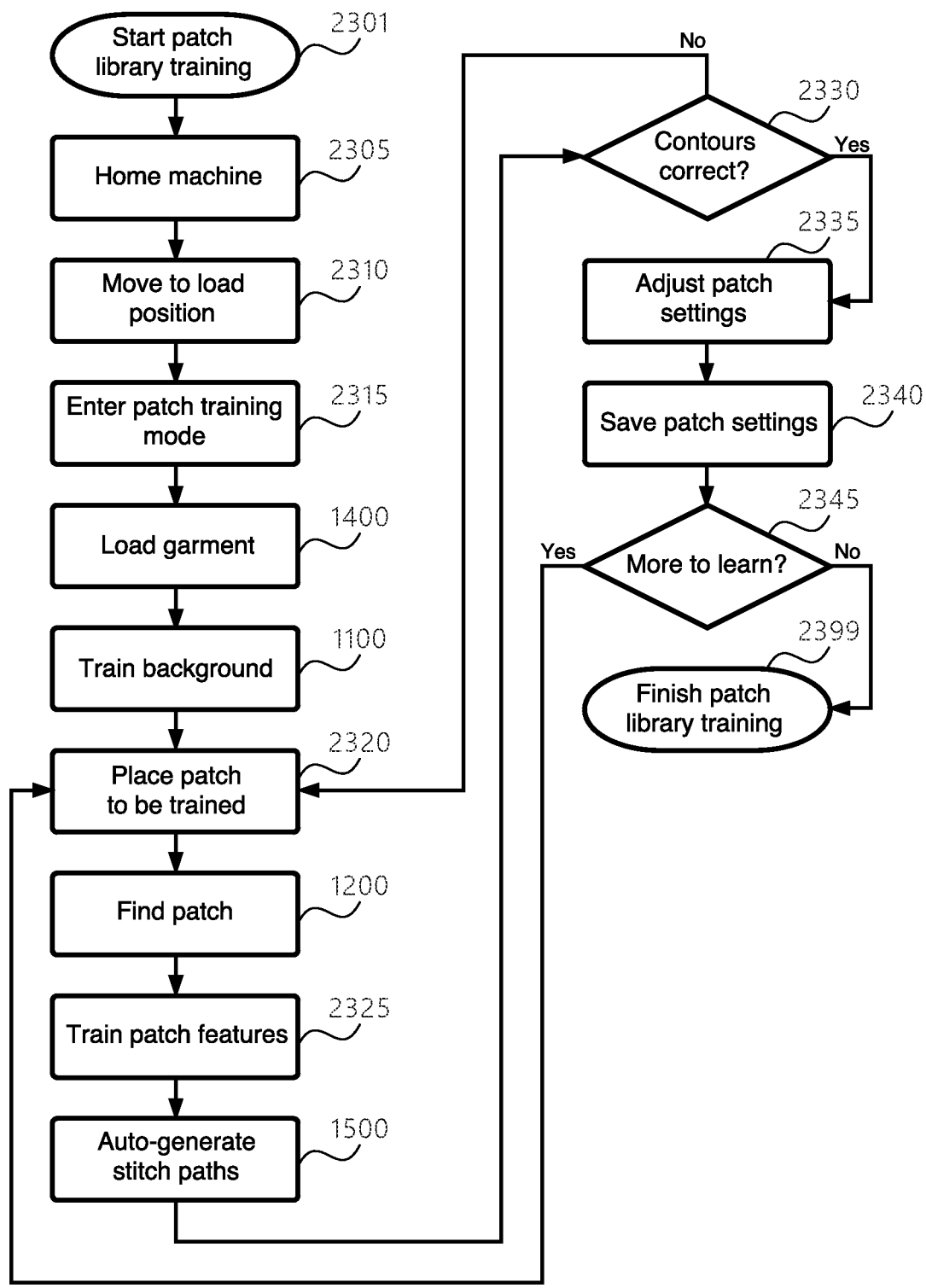
FIG. 23 is a flowchart related to a library training method consistent with various embodiments of the present disclosure.

FIG. 23 is a flowchart related to a patch library training method 2300 consistent with various embodiments of the present disclosure. Patch training can be utilized in embodiments comprising a patch library to teach the system visual and physical parameters, as well as desired options (such as thread patterns such as "zig zag" or "straight"), regarding the patch, to be recalled in a sewing operation. Patch training may comprise the vision system learning internal features of a patch, outline/edge features of a patch, or both. In some embodiments, apparatus 100 may utilize both internal visual features and edge features to more accurately identify and spatially locate a patch. This may occur in a single operation, or in a series of operations—in an example, internal patch features may be used to get a rough location, and then edge features may be used to fine tune stitch locations.

Method 2300 may comprise modifying or adding to patch configuration information by a user. For example, a user may indicate for certain areas or patch features to be ignored by the vision system when detecting and locating the patch. In other examples, a user may make manual adjustments to stitch paths, make manual entries or adjustments regarding patch geometry or features (e.g., setting a patch thickness, or setting material properties for segments of a stitch path to inform sewing parameters more effectively), or place non-processable features that are to be avoided or stitched around.

2400. Sew Patch(es)

Figure 24:
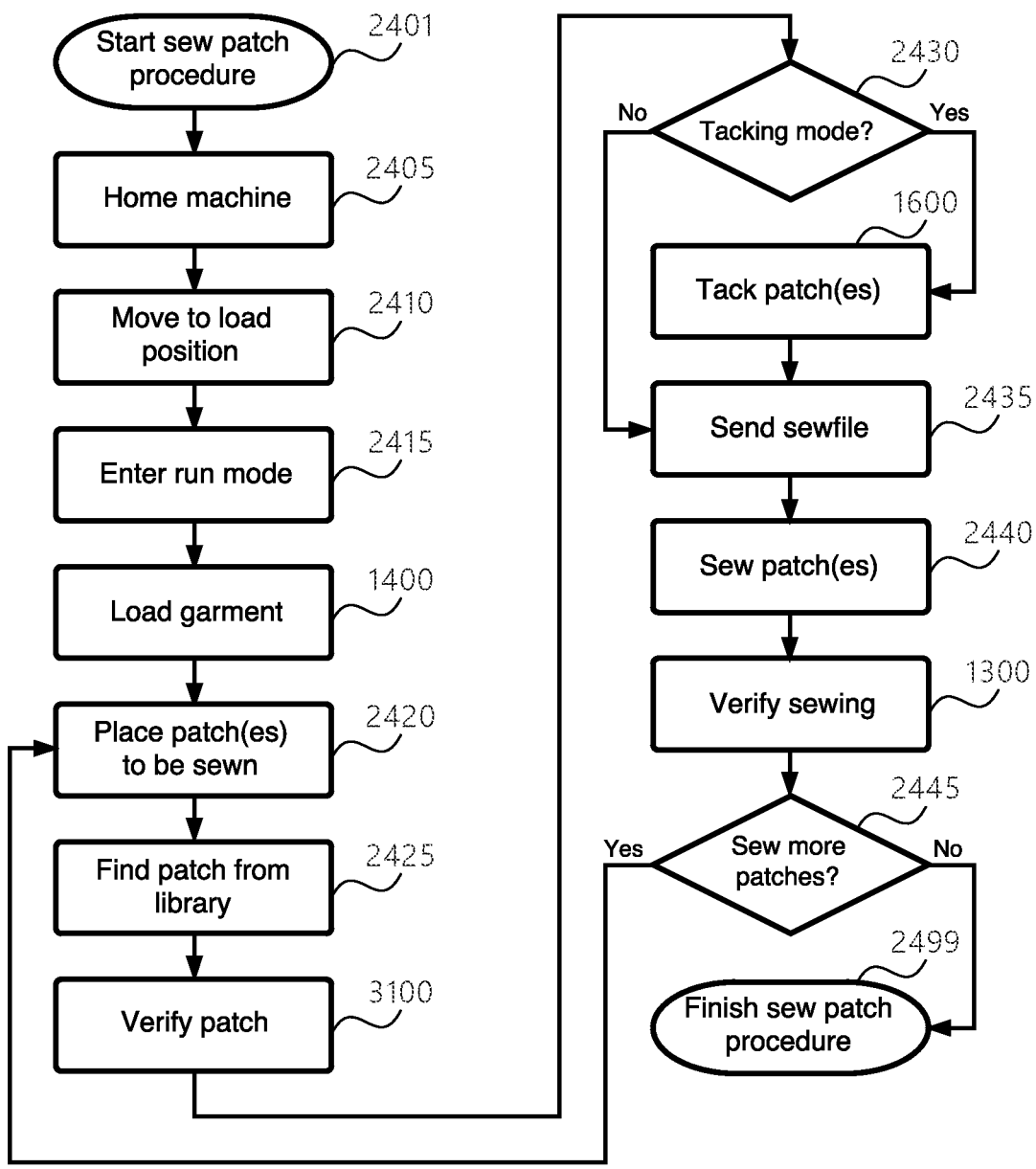
FIG. 24 is a flowchart related to still another patch sewing method consistent with various embodiments of the present disclosure.

FIG. 24 is a flowchart related to a patch sewing and inspection method 2400 consistent with various embodiments of the present disclosure. In various embodiments, method 2400 may proceed in similar fashion to method 1000 as illustrated in FIG. 10. while including the addition of one or patch library stages. For example, method 2400 can include a stage 2425 of finding one or more placed patches in a patch library that contains data on the found patch. Such data can contain many parameters about the patch to be sewn, such as thread pattern, thread color, contours, height, and appearance. This data may aid in expediting patch sewing jobs that will utilize a patch repeatedly over the batch.

2600. Detect Obstruction

Figure 26:
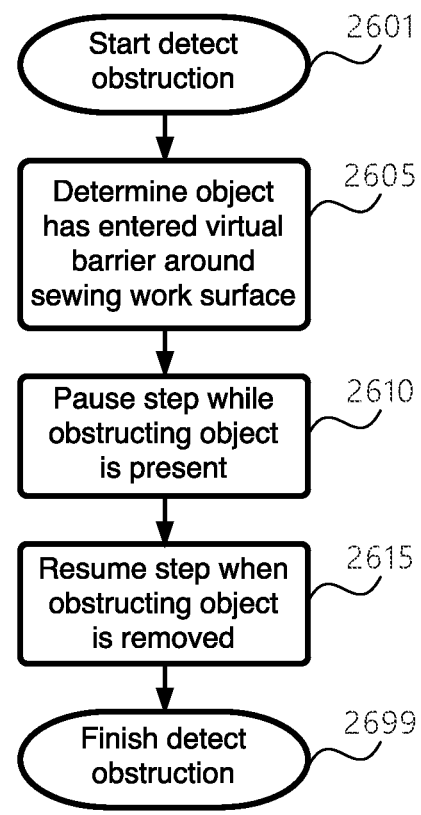
FIG. 26 is a flowchart related to an obstruction detection method consistent with various embodiments of the present disclosure.

FIG. 26 is a flowchart related to a detection method 2600 consistent with various embodiments of the present disclosure. Embodiments of the present disclosure may include a virtual light curtain feature. Such a feature may be inclusive of, or included in, a gesture recognition system or a facial expression recognition system. In embodiments consistent with either or both of these features, it may be possible to detect the presence of a human appendage (e.g., a hand, but potentially including other natural and artificial appendages), or generally an object, in the operational area 320 of an apparatus 100. By doing this, apparatus 100 may determine the optimal time to perform background training and patch finding. Upon detecting an incursion into the workspace, a VLC might act as an indicator to apparatus 100 to slow or stop and operation, or to refrain from commencing an operation. Detecting an object may be limited to detecting ingress, continued presence, and egress of an object, or may comprise detecting an object that is merely present—as an unwanted "obstruction" or "defect", as an indicator or "beacon", as an intended placement that nevertheless cannot be impinged (such as a wire or strut), or otherwise—in the operational area 320.

Some embodiments of the present disclosure may perform background training as soon as a garment is loaded and the clamp closed. If an obstruction such as an operator hand is in the workspace, it may throw off training, requiring manual reentry of the training process. In embodiments consistent with VLC features, apparatus 100 may be configured instead to sense the obstruction and wait to perform training until the obstruction has been cleared. VLC capabilities may also provide additional or alternative vehicles for automating processes in various methods of various embodiments. For example, an indication to enter patch finding may be provided by VLC as opposed to manual input by an operator.

VLC features may, in some embodiments, be achievable with—or integral within—an extant visual system (optics, lighting, sensors, etc.) In other embodiments, VLC features may necessitate one or more additional, dedicated, or discrete components.

2700. Detect Gesture

Figure 27:
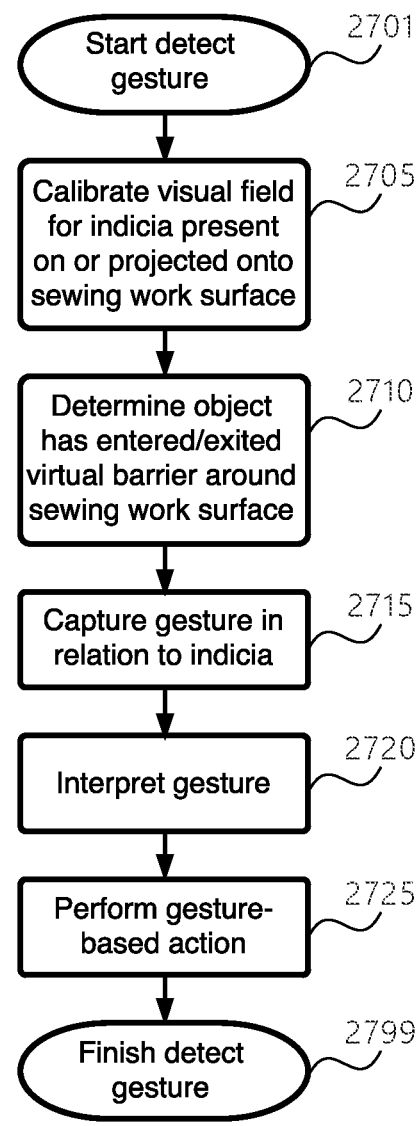
FIG. 27 is a flowchart related to a gesture detection method consistent with various embodiments of the present disclosure.

FIG. 27 is a flowchart related to a detection method 2700 consistent with various embodiments of the present disclosure. Gesture detection can be a feature consistent with embodiments having VLC capabilities. Gesture recognition may allow an operator to interact with a machine 110 by the use of hand motions within the workspace. In an example, a virtual button configuration may be projected onto the workspace, and gesture detection may be used (by itself, or in combination with other features such as AR or 3-D vision) to determine whether and how an operator interacts with the virtual button space (e.g., confirming a patch recognized by apparatus 100 and selected from a patch library).

Gesture detection may, but need not, proceed as illustrated in FIG. 27 by method 2700. An image capture aspect of an apparatus 100 vision system might be employed to detect and interpret operator gestures. In some embodiments, gesture detection may be triggered by an indication that there is an object within the virtual light curtain zone.

2900. Train Background

Figure 29:
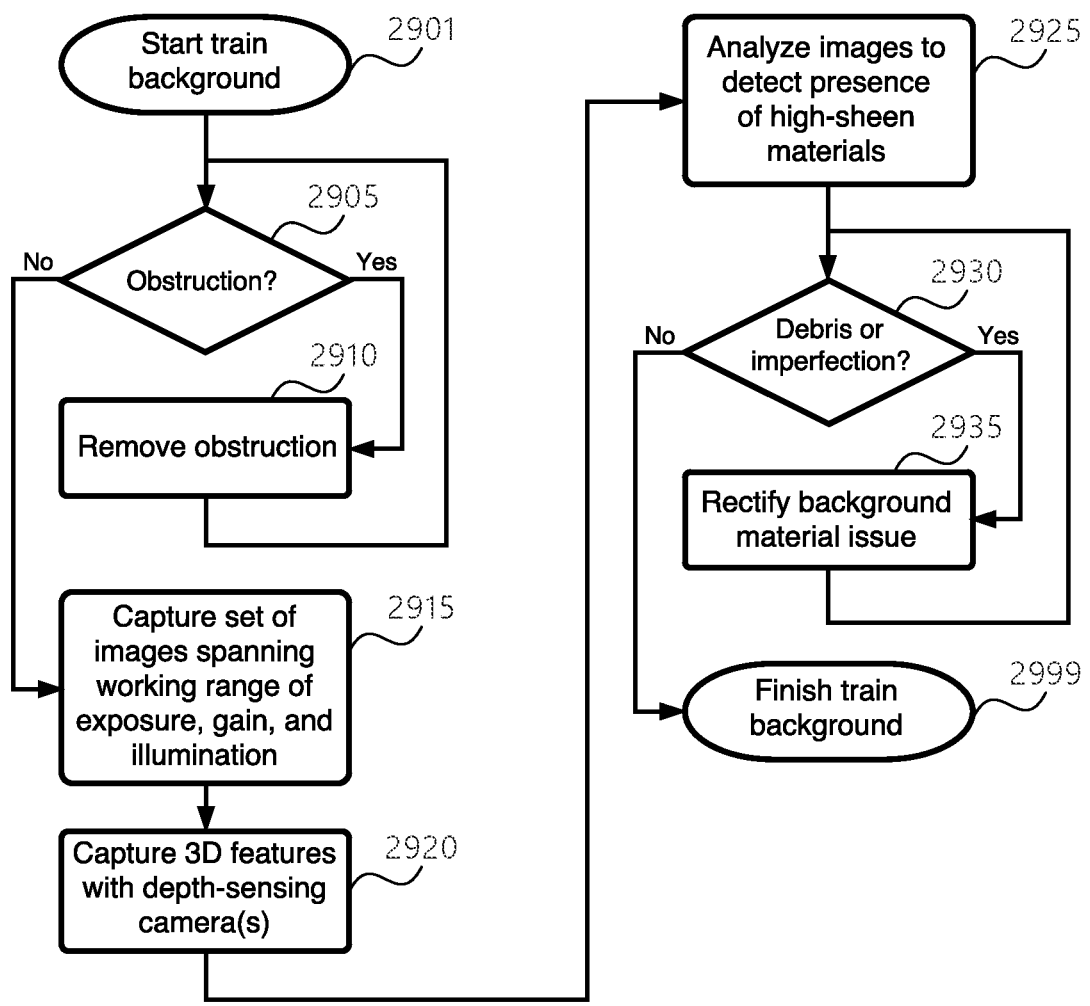
FIG. 29 is a flowchart related to yet another background training method in accordance with various embodiments of the present disclosure.

FIG. 29 is a flowchart related to a background training method 2900 consistent with various embodiments of the present disclosure. Method 2900 is consistent with embodiments having depth-aware or 3-dimensional vision systems. Such a system may use various methods to achieve z-axis (height off the workspace) spatial awareness of the working area, such as dual (stereoscopic) or multiple cameras, electromagnetic sensors, processing of controlled motion image captures, and the like.

When sewing garments with general purpose clamping, depth variation due to various factors, such as material sagging, multi-ply stacks, wrinkles or folds in the fabric, etc. can introduce significant uncertainty in locating ledges in 3-D space and thus cause errors in stitch pattern generation and compensation.

Embodiments featuring 3-D vision capabilities may ascertain path thickness, material thickness, and sagging, among other spatial properties. Such embodiments may better accommodate the accurate sewing of patches (e.g., multi-layer or significantly protruding) and/or substrates (e.g., shoes or hats) that are not flat. Examples include uneven surfaces due to multiple layers of materials that are different shapes stacked on top of each other, or sewing on a complex curved object, such as a car dashboard.

Figure 28:
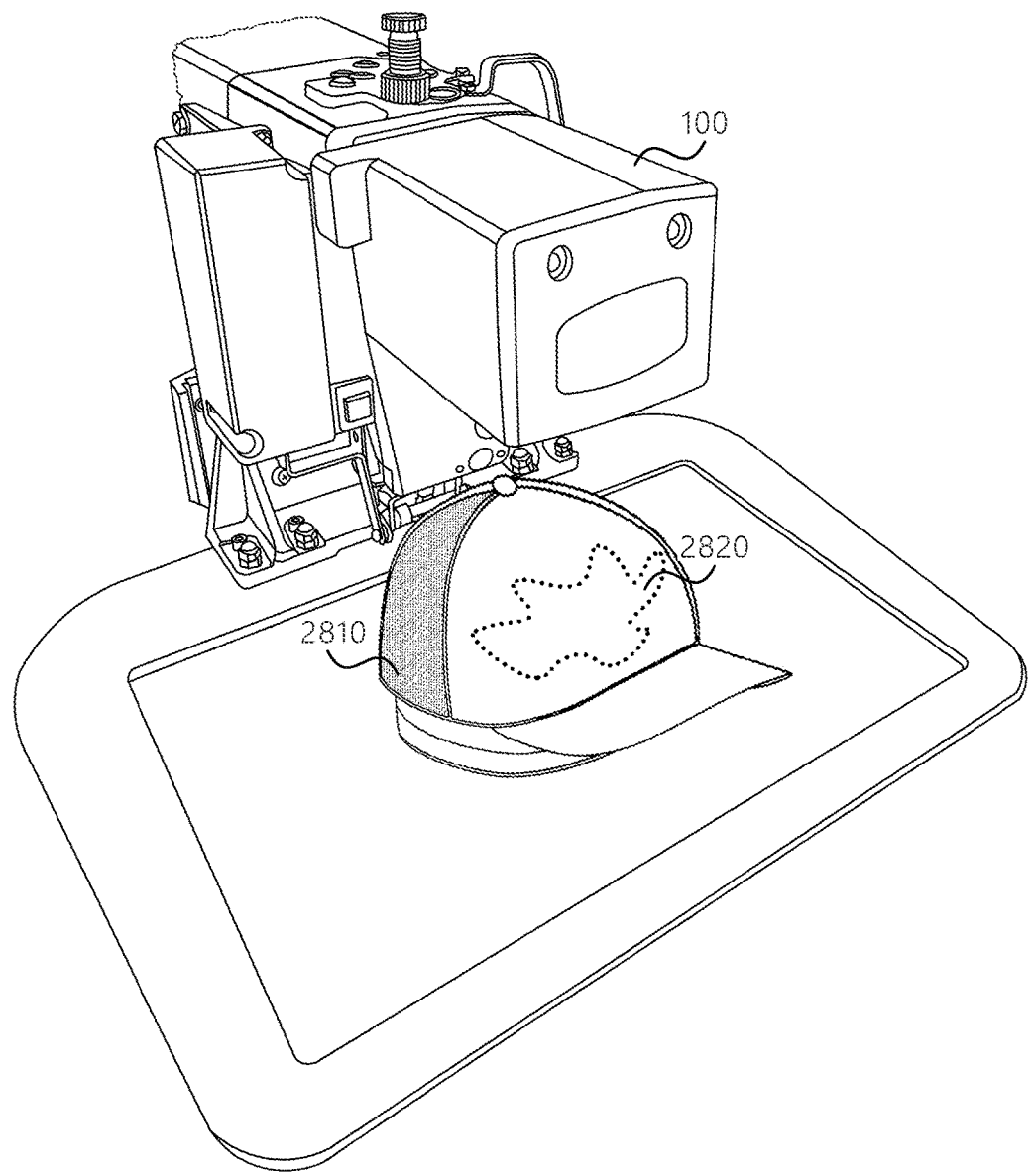
FIG. 28 illustrates a perspective view of a guiding apparatus having a 3-dimensional vision system in accordance with various embodiments of the present disclosure.

Various 3-D vision embodiments may also aid in detecting tension in thread or thread stitching defects during verification. In addition to traditional stereo (2 cameras separated in distance) 3-D vision may be achieved by "depth from motion" with mono-vision hardware by instructing the sewing machine to move the garment a known amount underneath the camera. An example of an object 2810 that may be amenable to having a patch 2820 sewn in a 3-D vision system is illustrated in FIG. 28, which depicts an exemplary apparatus 100 that can comprise a 3-D vision system.

Method 2900 may comprise analysis of imaging information gathered by a vision system to detect high-sheen materials and make adjustments based thereon, which may involve performing an action or making an adjustment based on a sheen value, such as exceeding a predetermined sheen level.

3000. Sew Patch(es)

Figure 30A:
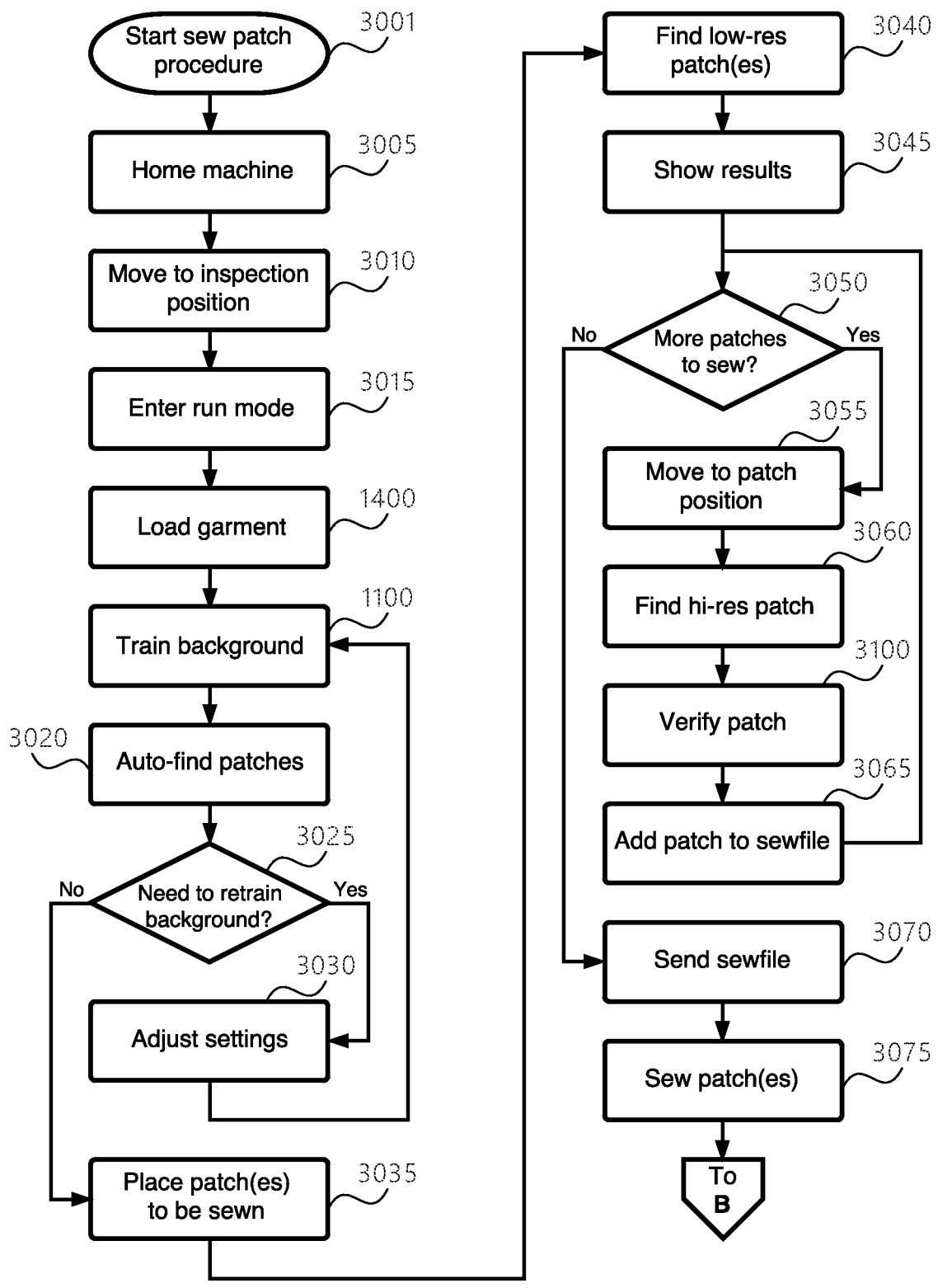
FIGS. 30A-B is a flowchart related to again another patch sewing method in accordance with various embodiments of the present disclosure.
Figure 30B:
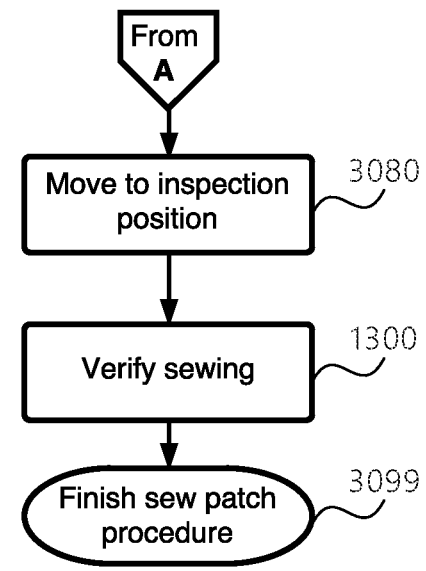

FIGS. 30A-B is a flowchart related to a patch sewing and inspection method 3000 consistent with various embodiments of the present disclosure. Embodiments may include multi-view multi-patch (MVMP) features. In various embodiments, method 3000 may proceed in similar fashion to method 1000 as illustrated in FIG. 10. while including the addition of one or more MVMP stages. MVMP stages can include a low(er)-res imaging stage that precedes a high(er)-res imaging stage in order to improve accuracy. Embodiments featuring MVMP may perform a sewing and inspection operation that includes an initial estimate of found patches, then move the patches (patch edges) directly under the camera to obtain a more direct view of the edge locations, eliminating or at least greatly reducing perspective/patch height/material thickness induced errors in stitch location. This mode may greatly improves accuracy at the cost of some cycle time since additional motion and imaging is performed prior to sewing.

3100. Verify Patch(es)

Figure 31:
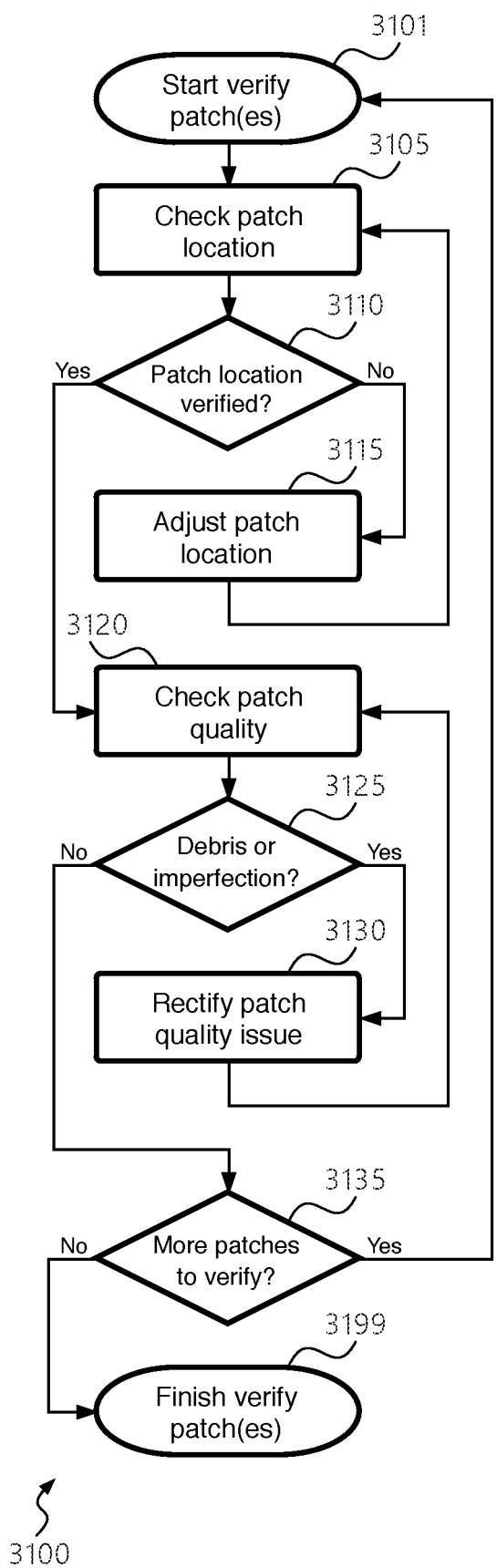
FIG. 31 is a flowchart related to a patch verification method in accordance with various embodiments of the present disclosure.

FIG. 31 is a flowchart related to a verification method 3100 consistent with various embodiments of the present disclosure. Various methods in various embodiments might employ a verify patches stage—two examples include method 3000 as illustrated in FIGS. 30A-B, and method 2400 as illustrated in FIG. 24.

In the context of an embodiment consistent with an apparatus 100 having patch library features, a stage such as method 3100 might detect deviations in a placed and imaged patch from its known-correct exemplar patch. For example, a patch library might contain badge 2510 as depicted in FIG. 25A. However, upon imaging placed badge 2520 as depicted in FIG. 25B, method 3100 can, upon detecting blemish 2530, alert the operator that the patch quality does not verify.

IV. Platform Architecture

The platform 500 may be embodied as, for example, but not be limited to, a website, a web application, a desktop application, and a mobile application compatible with a computing device. Moreover, platform 500 may be hosted on a centralized server, such as, for example, a cloud computing service. Alternatively, platform 500 may be implemented in one or more of the plurality of mobile devices. Although methods disclosed herein have been described to be performed by a computing device 3200, it should be understood that, in some embodiments, different operations may be performed by different networked elements in operative communication with computing device 3200. The computing device 3200 may comprise, but not be limited to, a desktop computer, laptop, a tablet, or mobile telecommunications device.

Embodiments of the present disclosure may comprise a system having a memory storage and a processing unit. The processing unit coupled to the memory storage, wherein the processing unit is configured to perform the stages of methods disclosed herein.

Figure 32:
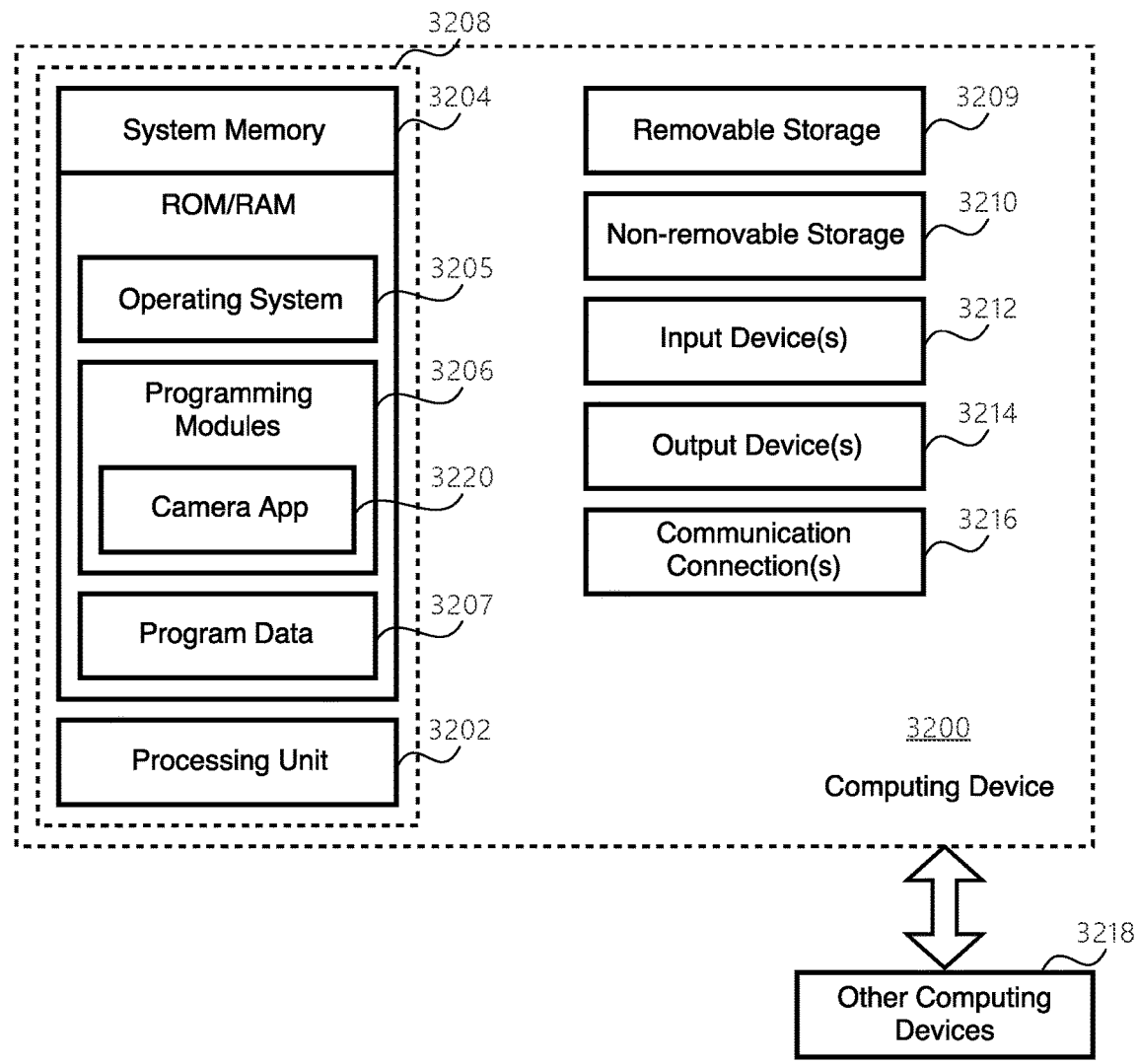
FIG. 32 is a platform for performing an action along a self-guided path in association with an object on a substrate in accordance with various embodiments of the present disclosure.

FIG. 32 is a block diagram of a system including computing device 3200. Consistent with various embodiments of the present disclosure, the aforementioned memory storage and processing unit may be implemented in a computing device, such as computing device 3200 of FIG. 32. Any suitable combination of hardware, software, or firmware may be used to implement the memory storage and processing unit. For example, the memory storage and processing unit may be implemented with computing device 3200 or any of other computing devices 3218, in combination with computing device 3200. The aforementioned system, device, and processors are examples and other systems, devices, and processors may comprise the aforementioned memory storage and processing unit, consistent with embodiments of the disclosure.

With reference to FIG. 32, a system consistent with various embodiments of the present disclosure may include a computing device, such as computing device 3200. In a basic configuration, computing device 3200 may include at least one processing unit 3202 and a system memory 3204. Depending on the configuration and type of computing device, system memory 3204 may comprise, but is not limited to, volatile (e.g., random access memory (RAM)), non-volatile (e.g., read-only memory (ROM)), flash memory, or any combination. System memory 3204 may include operating system 3205, one or more programming modules 3206, and may include a program data 3207. Operating system 3205, for example, may be suitable for controlling computing device 3200's operation. Features of programming modules 3206 may include formatting and displaying information to the user, enabling scrolling, and formulating and transmitting messages. Furthermore, embodiments of the disclosure may be practiced in conjunction with a graphics library, other operating systems, or any other application program and is not limited to any particular application or system. This basic configuration is illustrated in FIG. 32 by those components within a dashed line 3208.

Computing device 3200 may have additional features or functionality. For example, computing device 3200 may also include additional data storage devices (removable and/or non-removable) such as, for example, magnetic disks, optical disks, or tape. Such additional storage is illustrated in FIG. 32 by a removable storage 3209 and a non-removable storage 3210. Computer storage media may include volatile and nonvolatile, removable and non-removable media implemented in any method or technology for storage of information, such as computer readable instructions, data structures, program modules, or other data. System memory 3204, removable storage 3209, and non-removable storage 3210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3200. Any such computer storage media may be part of device 3200. Computing device 3200 may also have input device(s) 3212 such as a keyboard, a mouse, a pen, a sound input device, a touch input device, a camera, a sensor, etc. Output device(s) 3214 such as a display, speakers, a printer, etc. may also be included. The aforementioned devices are examples and others may be used.

Computing device 3200 may also contain a communication connection 3216 that may allow device 3200 to communicate with other computing devices 3218, such as over a network in a distributed computing environment, for example, an intranet or the Internet. Communication connection 3216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules 3206 and data files may be stored in system memory 3204, including operating system 3205. While executing on processing unit 3202, programming modules 3206 (e.g., scrolling enablement application 3220) may perform processes including, for example, one or more of method stages as described above. The aforementioned process is an example, and processing unit 3202 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Note that references throughout this disclosure to apparatus 100 should be understood as incorporating, in a non-limiting manner, elements, aspects, functions, etc. of platform 500, machine 110, computing unit 400, and/or computing device 3200, as needed to affect the methods and functions of various embodiments.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A guiding apparatus comprising:
an operational area; and
an augmented reality system comprising:
  a vision system, and
  an illumination system,
wherein the augmented reality system is configured to:
  project augmented reality features onto one or more operational objects, and
  identify the one or more operational objects for a subsequent stitching operation of the guiding apparatus along a predetermined path.

2. The apparatus of claim 1, wherein the augmented reality system is configured to enable a user to interact with a projected augmented reality feature via at least one of: touch and gesture; and wherein the guiding apparatus is configured to respond to at least one of the touch and the gesture.

3. The apparatus of claim 1, wherein the augmented reality system is configured to:
identify a calibration target in the operational area,
project fiducials onto the calibration target,
determine, by the vision system, image information and spatial characteristics associated with the calibration target,
calibrate the illumination system based on at least one of the image information and the spatial characteristics,
project, by the calibrated illumination system, a calibration grid pattern onto the operational area,
sew a stitch pattern matching the calibration grid pattern, and
calibrate the vision system based at least on the stitch pattern.

4. The apparatus of claim 1, wherein the augmented reality system is configured to:
identify a substrate in the operational area based at least on first augmented reality features projected by the augmented reality system,
remove from the substrate any abnormalities detected by the vision system,
identify one or more patches at a position on the substrate based at least on second augmented reality features projected by the augmented reality system,
sew, by the guiding apparatus, the one or more patches using a stitch pattern, and
determine, by the vision system, the stitch pattern of the one or more patches matches the second augmented reality features.

5. The apparatus of claim 1, wherein the illumination system comprises a bank of illumination sources comprising at least one of diode sources, laser sources, electric discharge sources, and incandescent sources; and wherein the bank of illumination sources is configured to provide uniform illumination and uniform positional accuracy of the augmented reality features throughout the operational area.

6. The apparatus of claim 1, wherein the apparatus is configured to project the augmented reality features directly onto the one or more operational objects.

7. The apparatus of claim 1, wherein the apparatus is configured to identify the one or more operational objects for the subsequent stitching operation of the guiding apparatus along the predetermined path.

8. The apparatus of claim 1, wherein the projected augmented reality features comprise visual indication of non-processable features.

9. The apparatus of claim 1, wherein the vision system is configured to detect abnormalities in the one or more operational objects; and wherein the projected augmented reality features comprise visual indication of detected abnormalities.

10. A method for calibrating an augmented reality system coupled with a guiding apparatus, the method comprising:
identifying a calibration target in an operational area of the guiding apparatus;
projecting fiducials onto the calibration target;
determining image information and spatial characteristics associated with the calibration target;
performing a first calibration process based on at least one of the image information and the spatial characteristics;
projecting a calibration grid pattern onto the operational area;
sewing a stitch pattern matching the calibration grid pattern; and
performing a second calibration process based at least on the stitch pattern.

11. The method of claim 10, further comprising:
projecting augmented reality features onto one or more operational objects.

12. The method of claim 11, further comprising:
identifying the one or more operational objects for a subsequent stitching operation of the guiding apparatus along a predetermined path.

13. The method of claim 10, wherein the projected augmented reality features comprise virtual user interface elements projected into the operational area.

14. The method of claim 13, further comprising receiving a user interaction with a projected augmented reality feature via at least one of: touch and gesture.

15. The method of claim 14, further comprising: responding to at least one of the touch and the gesture.

16. The method of claim 11, wherein the projected augmented reality features comprise visual indication of non-processable features.

17. The method of claim 10, further comprising:
detecting abnormalities in one or more operational objects.

18. The method of claim 17, wherein the projected augmented reality features comprise visual indication of detected abnormalities.

19. A method for operating an augmented reality system coupled with a guiding apparatus, the method comprising:

identifying a substrate in an operational area of the guiding apparatus based at least on a first set of projected augmented reality features;

identifying one or more patches at a position on the substrate based at least on a second set of projected augmented reality features;

sewing the one or more patches using a stitch pattern; and determining the stitch pattern of the one or more patches matches the second set of projected augmented reality features.

20. The method of claim 19, further comprising:

projecting virtual user interface elements into the operational area;

receiving a user interaction with a projected user interface element via at least one of: touch and gesture; and responding to at least one of the touch and the gesture.

* * * * *